US011055249B2

(12) United States Patent
Bueb et al.

(10) Patent No.: US 11,055,249 B2
(45) Date of Patent: Jul. 6, 2021

(54) ACCESS OPTIMIZATION IN AGGREGATED AND VIRTUALIZED SOLID STATE DRIVES

(71) Applicant: Micron Technology, Inc., Boise, ID (US)

(72) Inventors: Christopher Joseph Bueb, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/452,366

(22) Filed: Jun. 25, 2019

(65) Prior Publication Data
US 2020/0409890 A1    Dec. 31, 2020

(51) Int. Cl.
*G06F 13/40*    (2006.01)
*G06F 13/16*    (2006.01)

(52) U.S. Cl.
CPC ...... *G06F 13/4027* (2013.01); *G06F 13/1605* (2013.01)

(58) Field of Classification Search
CPC .................. G06F 13/4027; G06F 13/1605
See application file for complete search history.

(56) References Cited

U.S. PATENT DOCUMENTS

| | | |
|---|---|---|
| 6,654,941 B1 | 11/2003 | Baumbach |
| RE43,346 E | 5/2012 | Miloushev et al. |
| 8,397,013 B1 | 3/2013 | Rosenband et al. |
| 8,694,724 B1 | 4/2014 | Linnell et al. |
| 8,935,493 B1 * | 1/2015 | Dolan ................... G06F 3/0649 |
| | | 711/117 |
| 10,437,476 B2 | 10/2019 | Frolikov |
| 2005/0280140 A1 | 12/2005 | Corbin et al. |
| 2006/0059308 A1 | 3/2006 | Uratani et al. |
| 2009/0188704 A1 | 7/2009 | Lee et al. |
| 2010/0082890 A1 * | 4/2010 | Heo ..................... G06F 12/0246 |
| | | 711/103 |
| 2010/0259882 A1 | 10/2010 | Song |
| 2010/0259885 A1 | 10/2010 | Zheng et al. |
| 2011/0191649 A1 * | 8/2011 | Lim ........................ G06F 11/10 |
| | | 714/752 |
| 2012/0079180 A1 | 3/2012 | Ren |
| 2012/0233386 A1 * | 9/2012 | Tong .................... G06F 3/0659 |
| | | 711/103 |
| 2013/0332694 A1 | 12/2013 | Reissner |

(Continued)

OTHER PUBLICATIONS

Aggregation and Virtualization of Solid State Drives, U.S. Appl. No. 16/452,333, filed Jun. 25, 2019, Poorna Kale et al., Docketed New Case—Ready for Examination, Jul. 30, 2019.

Aggregated and Virtualized Solid State Drives with Multiple Host Interfaces, U.S. Appl. No. 16/452,340, filed Jun. 25, 2019, Poorna Kale et al., Docketed New Case—Ready for Examination, Jul. 27, 2019.

(Continued)

*Primary Examiner* — Henry Tsai
*Assistant Examiner* — John B Roche
(74) *Attorney, Agent, or Firm* — Greenberg Traurig

(57) ABSTRACT

A solid state drive having a drive aggregator and multiple component solid state drives. Different component solid state drives in solid state drive are configured with different optimizations of memory/storage operations. An address map in the solid state drive is used by the drive aggregator to host different namespaces in the component solid state drives based on optimization requirements of the namespaces and based on the optimizations of memory operations that have been implement in the component solid state drives.

20 Claims, 13 Drawing Sheets

(56) References Cited

U.S. PATENT DOCUMENTS

| | | | |
|---|---|---|---|
| 2015/0130059 A1* | 5/2015 | Ozawa | H01L 25/0657 |
| | | | 257/738 |
| 2015/0255130 A1 | 9/2015 | Lee et al. | |
| 2016/0124847 A1 | 5/2016 | Malwankar et al. | |
| 2017/0046295 A1* | 2/2017 | Schwemmer | G06F 13/4282 |
| 2017/0109184 A1 | 4/2017 | Ramani et al. | |
| 2017/0228328 A1 | 8/2017 | Armstrong et al. | |
| 2017/0249256 A1 | 8/2017 | Kim et al. | |
| 2018/0088854 A1 | 3/2018 | Noh et al. | |
| 2018/0150401 A1 | 5/2018 | Chang | |
| 2019/0079895 A1 | 3/2019 | Kim et al. | |
| 2019/0278498 A1 | 9/2019 | Dedrick | |
| 2019/0294339 A1 | 9/2019 | Bolkhovitin et al. | |
| 2020/0045110 A1 | 2/2020 | Varnica et al. | |
| 2020/0050470 A1 | 2/2020 | Guo et al. | |
| 2020/0151104 A1 | 5/2020 | Yang | |
| 2020/0409567 A1 | 12/2020 | Bueb et al. | |
| 2020/0409574 A1 | 12/2020 | Kale et al. | |
| 2020/0409807 A1 | 12/2020 | Kale et al. | |
| 2020/0409832 A1 | 12/2020 | Bueb et al. | |
| 2020/0409889 A1 | 12/2020 | Kale et al. | |
| 2020/0409891 A1 | 12/2020 | Kale et al. | |

OTHER PUBLICATIONS

Fail-Safe Redundancy in Aggregated and Virtualized Solid State Drives, U.S. Appl. No. 16/452,341, filed Jun. 25, 2019, Christopher Bueb et al., Docketed New Case—Ready for Examination, Jul. 30, 2019.

Dynamic Fail-Safe Redundancy in Aggregated and Virtualized Solid State Drives, U.S. Appl. No. 16/452,344, filed Jun. 25, 2019, Poorna Kale et al., Docketed New Case—Ready for Examination, Aug. 6, 2019.

Aggregated and Virtualized Solid State Drives Accessed via Multiple Logical Address Spaces, U.S. Appl. No. 16/452,369, filed Jun. 25, 2019, Christopher Bueb et al., Publications—Issue Fee Payment Verified, Jan. 22, 2021.

Aggregated and Virtualized Solid State Drives Accessed via Multiple Logical Address Spaces, U.S. Appl. No. 17/170,766, filed Feb. 8, 2021, Christopher Bueb et al., Application Undergoing Preexam Processing, Feb. 8, 2021.

Parallel Operations in Aggregated and Virtualized Solid State Drives, U.S. Appl. No. 16/452,372, filed Jun. 25, 2019, Poorna Kale et al., Notice of Allowance Mailed—Application Received in Office of Publications, Oct. 30, 2020.

* cited by examiner

ACCESS OPTIMIZATION IN AGGREGATED AND VIRTUALIZED SOLID STATE DRIVES

FIELD OF THE TECHNOLOGY

At least some embodiments disclosed herein relate to memory systems in general, and more particularly, but not limited to optimization of memory/storage access in aggregation and virtualization of solid state drives.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a specific type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to techniques to aggregate multiple memory sub-systems as a combined memory sub-system that functions as a single memory sub-system to a host system. In some embodiments, the single memory sub-system is configured with multiple host interfaces to service multiple host systems, or service a host system via multiple parallel and/or redundant connections.

Currently, a solid state drive (SSD) can be provided in a single integrated circuit package. For example, the solid state drive (SSD) can be packaged with a ball grid array (BGA) form factor. The BGA SSD has a controller embedded in the integrated circuit package to process commands from a host system, control operations to access data in media units or memory components embedded in the BGA SSD, and generate responses to the commands from the host system. However, the single integrated circuit package and/or the BGA form factor can limit the storage capacity of the BGA SSD.

At least some aspects of the present disclosure address the above and other deficiencies through a drive aggregator that is configured to aggregate and virtualize multiple SSDs as a single SSD for the host system. Thus, multiple BGA SSDs can be used to construct one high capacity SSD for the host system. The combined SSD can have a storage capacity that is not limited by the single integrated circuit package and/or the BGA form factor.

In general, the drive aggregator can be used to aggregate and virtualize multiple memory sub-systems for a host system. One example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

Figure 1:
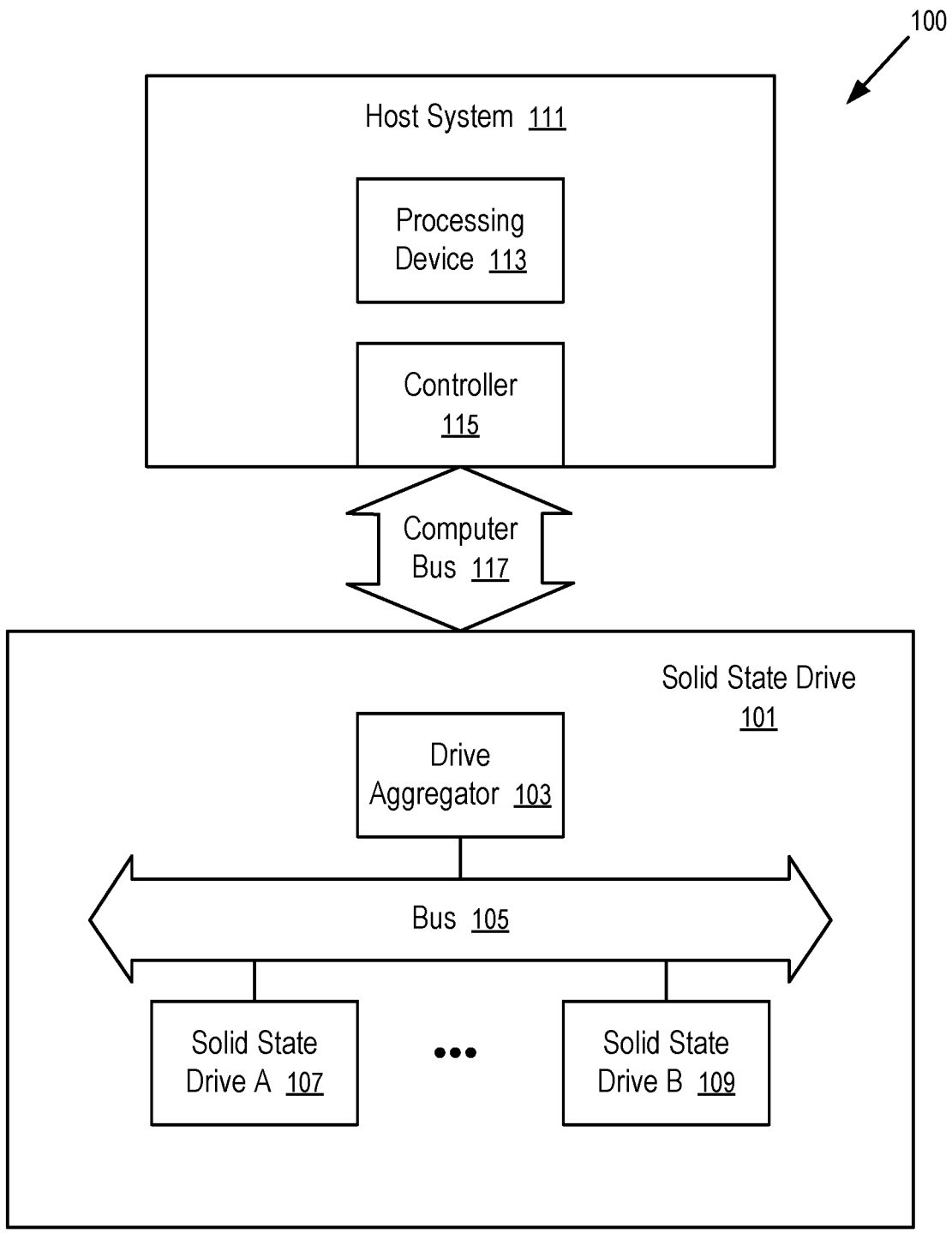
FIG. 1 illustrates an example computing system having a memory sub-system in accordance with some embodiments of the present disclosure.

FIG. 1 illustrates an example computing system 100 having a memory sub-system in accordance with some embodiments of the present disclosure. In FIG. 1, a solid state drive 101 is shown as an example of such a memory sub-system. The aggregated solid state drive 101 is constructed using multiple component solid state drives 107 to 109. A driver aggregator 103 of the solid state drive 101 virtualizes the entire combined capacity of the multiple component solid state drives 107 to 109 as the capacity of the aggregated solid state drive 101. The drive aggregator 103 shields the component solid state drives 107 to 109 from a host system 111 such that the host system 111 can access the memory capacity of the multiple component solid state drives 107 to 109 by addressing the single solid state drive 101. Each of the component solid state drives 107 to 109 in FIG. 1 is another example of a memory sub-system in general.

In general, a memory sub-system can include media, such as media units/memory components. The media units/memory components can be volatile memory components, non-volatile memory components, or a combination of such. Each of the media units/memory components can perform operations to store, record, program, write, or commit new data independent of the operations of other media units/memory components. Thus, the media units/memory components can be used in parallel in executing write commands. In some embodiments, the memory sub-system is a storage system. An example of a storage system is a solid state drive (SSD). In other embodiments, the memory sub-system is a memory module. Examples of a memory module includes a DIMM, NVDIMM, and NVDIMM-P. In further embodiments, the memory sub-system is a hybrid memory/storage sub-system. In general, the computing system 100 can include a host system 111 that uses a memory sub-system (e.g., the solid state drive 101) through a computer bus 117. For example, the host system 111 can write data to the memory sub-system and read data from the memory sub-system.

The host system 111 can be a computing device such as a desktop computer, laptop computer, network server, mobile device, or such computing device that includes a memory and a processing device. The host system 111 can include or be coupled to the memory sub-system, such as the solid state drive 101, via a computer bus 117, so that the host system 111 can read data from or write data to the memory sub-system. The host system 111 can be coupled to the memory sub-system via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 111 and the memory sub-system, such as the solid state drive 101. The host system 111 can further utilize an NVM Express (NVMe) interface to access the storage capacity of the memory sub-system when the memory sub-system is coupled with the host system 111 by the PCIe interface. The physical host interface can provide an interface for passing control, address, data, and other signals between the host system 111 and the memory sub-system, such as the solid state drive 101. FIG. 1 illustrates a solid state drive 101 as an example a memory sub-system. In general, the host system 111 can access multiple memory sub-systems via a same communication connection, multiple separate communication connections, and/or a combination of communication connections.

The host system 111 includes a processing device 113 and a controller 115. The processing device 113 of the host system 111 can be, for example, a microprocessor, a central processing unit (CPU), a processing core of a processor, an execution unit, etc. In some instances, the controller 115 can be referred to as a memory controller, a memory management unit, and/or an initiator. In one example, the controller 115 controls the communications over the computer bus 117 coupled between the host system 111 and the memory sub-system, such as the solid state drive 101.

In general, the controller 115 can send commands or requests to a memory sub-system for desired access to memory storage capacity. The controller 115 can further include interface circuitry to communicate with the memory sub-system via the computer bus 117. The interface circuitry can convert responses received from memory sub-system into information for the host system 111.

The controller 115 of the host system 111 can communicate with controller 115 of the memory sub-system to perform operations such as reading data, writing data, or erasing data at the memory components of the memory sub-system and other such operations. In some instances, the controller 115 is integrated within the same integrated circuit package of the processing device 113. In other instances, the controller 115 is separate from the integrated circuit package of the processing device 113. The controller 115 and/or the processing device 113 can include hardware such as one or more integrated circuits and/or discrete components, a buffer memory, a cache memory, or a combination thereof. The controller 115 and/or the processing device 113 can be a microcontroller, special purpose logic circuitry (e.g., a field programmable gate array (FPGA), an application specific integrated circuit (ASIC), etc.), or another suitable processor.

In general, media units/memory components of a memory sub-system (e.g., the solid state drive 107 or 109) can include any combination of the different types of non-volatile memory components and/or volatile memory components. An example of non-volatile memory components includes a negative-and (NAND) type flash memory. Each of the memory components can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system 111. Although non-volatile memory components such as NAND type flash memory are described, the memory components can be based on any other type of memory such as a volatile memory. In some embodiments, the memory components can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components can be grouped as memory pages or data blocks that can refer to a unit of the memory component used to store data.

In general, a memory sub-system (e.g., the solid state drive 107 or 109) can have a controller that communicates with the memory components of the memory sub-system to perform operations such as reading data, writing data, or erasing data and other such operations (e.g., in response to commands scheduled on a command bus). The controller of the memory sub-system can include hardware such as one or more integrated circuits and/or discrete components, a buffer memory, or a combination thereof. The controller of the memory sub-system can be a microcontroller, special purpose logic circuitry (e.g., a field programmable gate array (FPGA), an application specific integrated circuit (ASIC), etc.), or another suitable processor. The controller of the memory sub-system can include a processing device (e.g., processor) configured to execute instructions stored in local memory of the controller. For example, the local memory of the controller of the memory sub-system can include an embedded memory configured to store instructions for performing various processes, operations, logic flows, and routines that control operation of the memory sub-system, including handling communications between the memory sub-system and a host system (e.g., 111). In some embodiments, the local memory can include memory registers storing memory pointers, fetched data, etc. The local memory can also include read-only memory (ROM) for storing micro-code. While a typical memory sub-system has a controller, in another embodiment of the present disclosure, a memory sub-system may not include a controller, and can instead rely upon external control (e.g., provided by an external host, or by a processor or controller separate from the memory sub-system).

In general, the controller of a memory sub-system (e.g., the solid state drive 107 or 109) can receive commands or operations from the host system 111 and can convert the commands or operations into instructions or appropriate commands to achieve the desired access to the memory components of the memory sub-system. The controller of the memory sub-system (e.g., the solid state drive 107 or 109) can be responsible for other operations such as wear leveling operations, garbage collection operations, error detection and error-correcting code (ECC) operations, encryption operations, caching operations, and address translations between a logical block address and a physical block address. The controller of the memory sub-system (e.g., the solid state drive 107 or 109) can further include host interface circuitry to communicate with a host system (e.g., 111) via the physical host interface. The host interface circuitry can convert the commands received from the host system into command instructions to access the memory components as well as convert responses associated with the memory components into information for the host system (e.g., 111).

A memory sub-system (e.g., the solid state drive 107 or 109) can also include additional circuitry or components. In some embodiments, the memory sub-system (e.g., the solid state drive 107 or 109) can include a cache or buffer (e.g., DRAM) and address circuitry (e.g., a row decoder and a column decoder) that can receive an address from the controller of the memory sub-system and decode the address to access the memory components in the memory sub-system.

The computing system 100 includes a drive aggregator 103 that aggregates the capacities of the component solid state drives 107 to 109 and virtualize the entire combined capacity as the capacity of the single solid state drive 101. In some embodiments, the drive aggregator 103 includes logic circuitry to translate the commands/requests from the host system 111 into commands/requests to the solid state drives 107 to 109 and/or translate the responses from the solid state drives 107 to 109 into responses to the host system 111. The drive aggregator 103 accesses commands from the host system 111 according to a communication protocol for a solid state drive to accept commands from host systems. The drive aggregator 103 constructs and transmits commands to each of the component solid state drives (e.g., 107 or 109) according to a communication protocol for host systems to issue commands to solid state drives. The drive aggregator 103 accepts responses from each of the component solid state drives (e.g., 107 or 109) according to a communication protocol between host systems and solid state drives. The drive aggregator 103 constructs and transmits responses to the host system 111 according to communication protocol between host systems and solid state drives. The communication protocol used between the host system 111 and the driver aggregator 103 can be the same as the communication protocol used between the driver aggregator 103 and the component solid state drives 107 to 109 in one embodiment. The communication protocol used between the host system 111 and the driver aggregator 103 can be different from the communication protocol used between the driver aggregator 103 and the component solid state drives 107 to 109 in one embodiment. The drive aggregator 103 behaves like a controller of a standard solid state drive to the host system 111 according to one communication protocol and behaves like a standard host system to the component solid state drives 107 to 109 according to the same, or a different, communication protocol.

In the solid state drive 101, the driver aggregator 103 is connected to the component solid state drives 107 to 109 via a bus 105. For example, the bus 105 can include point to point serial connections from the driver aggregator 103 to the component solid state drives 107 to 109. The point to point serial connections between the driver aggregator 103 and the component solid state drives 107 to 109 can be in accordance with a serial advanced technology attachment (SATA) communication protocol, a peripheral component interconnect express (PCIe) communication protocol, or another protocol. The computer bus 117 between the host system 111 and the drive aggregator 103 can be in in accordance with a serial advanced technology attachment (SATA) communication protocol, a peripheral component interconnect express (PCIe) communication protocol, a universal serial bus (USB) communication protocol, a Fibre Channel communication protocol, a Serial Attached SCSI (SAS) communication protocol, a double data rate (DDR) memory bus communication protocol, etc.

The drive aggregator 103 can be implemented using an integrated circuit chip having a field programmable gate array (FPGA) or an application specific integrated circuit (ASIC). Alternatively, the drive aggregator 103 can be implemented at least in part via software or firmware. For example, the driver aggregator 103, or the processing device embedded within the driver aggregator 103, can be configured to execute instructions stored in memory for performing the operations of the drive aggregator 103 described herein. In some embodiments, the drive aggregator 103 is implemented in a single integrated circuit chip configured on the overall solid state drive 101 that has multiple component solid state drives 107.

Figure 2:
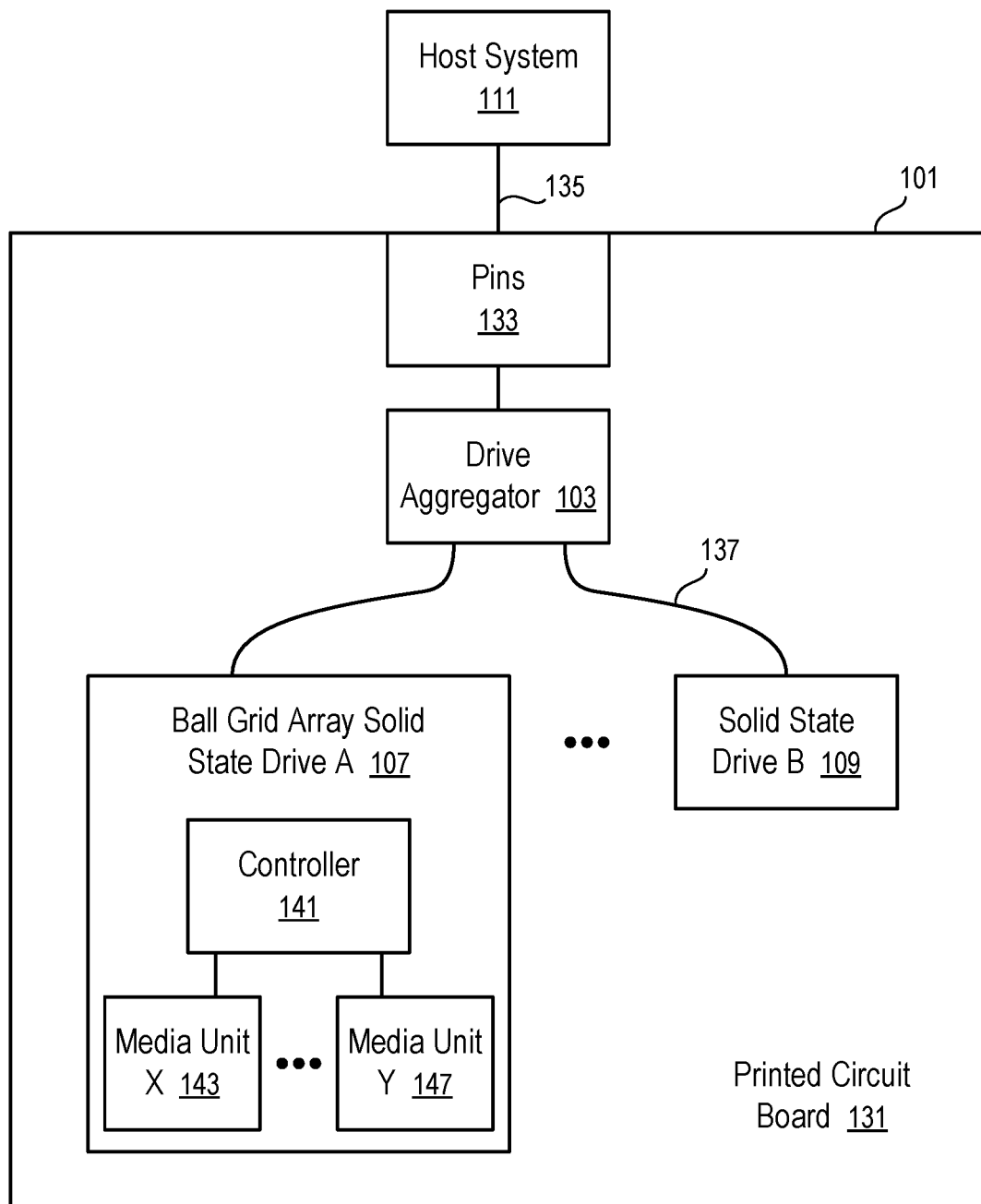
FIG. 2 shows a host system connected to a virtualized single solid state drive having multiple component solid state drives.

FIG. 2 shows a host system 111 connected to a virtualized single solid state drive having multiple component solid state drives 107 to 109. For example, the virtualized single solid state drive can be used to implement the solid state drive 101 illustrated in FIG. 1.

In FIG. 2, a printed circuit board 131 is configured to have pins 133 for a connection 135 to the host system 111 as a single solid state drive 101. For example, the connection 135 can be a point to point serial connection in accordance with SATA, PCIe, USB, or another standard. Based on the communication standard, the host system 111 is configured to recognize the device configured on the printed circuit board 131 as a single solid state drive 101. The host system 111 addresses memory in the device based on the recognition of the device as a single solid state drive 101.

Commands from the host system 111 are received in the drive aggregator 103 via the connection 135 and the pins 133. The received commands are processed in the drive aggregator 103 for adjustment, mapping, and/or distribution to the component solid state drives 107 to 109. For example, each of the component solid state drives 107 to 109 can be implemented as a ball grid array (BGA) solid state drive (SSD) that is capable of processing the commands from the host system 111 directly. For example, when the connection 137 from the component solid state drive 109 to the drive aggregator 103 is reconnected directly to the host system 111, the host system 111 can recognize the solid state drive 109 and communicate directly the solid state drive 109 to store data in the solid state drive 109 and/or retrieve data from the solid state drive 109.

For example, a BGA SSD 107 can have a controller 141 that is capable of communicating with a host system (e.g., 111) directly to receive commands and provide responses; and the BGA SSD 107 can have multiple media units (memory components) 143 to 147 that have memory cells to store data.

The drive aggregator 103 is configured to shield the details of the component solid state drives 107 to 109 from the host system 111. Thus, the host system 111 does not have to address the component solid state drives 107 to 109 separately. For examples, according to a set of predetermined rules, the drive aggregator 103 can forward some commands from host system 111 to one component solid state drive (e.g., 107) and forward other commands from the host system 111 to another component solid state drive (e.g., 109).

For example, the drive aggregator 103 can divide the logical address space of the entire capacity of the device configured on the printed circuit board 131 into multiple regions. Each of the regions is associated with a corresponding one of the component solid state drives 107 to 109. When the drive aggregator 103 receives a command is received from the host system 111, the drive aggregator 103 determines the region in which the logical address of the command is located, identifies the target solid state drive (e.g., 107) that is associated with the determined region, adjusts the command to at least map the logical address in the command received in the host to the logical address in the target solid state drive (e.g., 107), and transmits the adjusted command to the target solid state drive (e.g., 107).

In some embodiments, the host system 111 is configured to organize the memory capacity of the virtualized single solid state drive 101 on the printed circuit board into named portions. A name portion of the memory capacity is a namespace. Logical addresses can be defined within different namespaces separate for the memory capacity of the virtualized single solid state drive 101. For example, a first namespace allocated on a first portion of the memory capacity of n blocks can have logical block addressing (LBA) addresses ranging from 0 to n−1; and a second namespace allocated on a second portion of the memory capacity of m block can have LBA addresses ranging from 0 to m−1. To access a memory block, the host system 111 identifies the namespace and the LBA address defined within the namespace.

The drive aggregator 103 can be configured to distribute operations requested by the host system 111 to the component solid state drives 107 to 109 based on namespaces. For example, the drive aggregator 103 can assign different namespaces created on the memory capacity of the virtualized single solid state drive 101 to different component solid state drives 107 to 109. Subsequently, the drive aggregator 103 can simply forward the commands from the host system 111 to the component solid state drives based on the namespaces specified in the commands.

Figure 3:
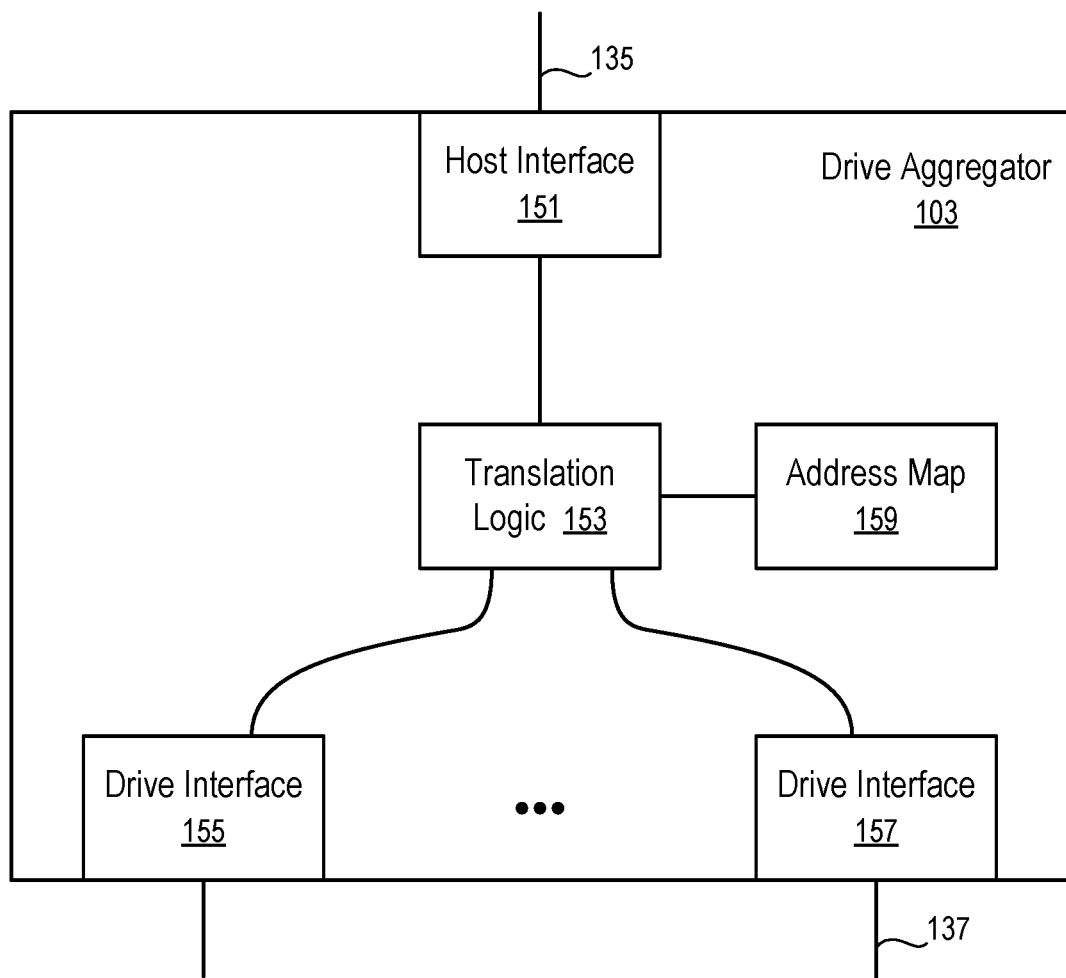
FIG. 3 shows a drive aggregator according to one embodiment.

FIG. 3 shows a drive aggregator 103 according to one embodiment. For example, the drive aggregator 103 of FIG. 3 can be used on the printed circuit board 131 of FIG. 2 and/or in the virtualized single solid state drive 101 of FIG. 1.

The drive aggregator 103 of FIG. 3 can be integrated within a single integrated circuit chip. The drive aggregator 103 of FIG. 3 includes a host interface 151 for a connection 135 to a host system (e.g., 111), a translation logic 153, and multiple drive interfaces 155 to 157. Each of the drive interfaces 155 to 157 can be used for a connection (e.g., 137) to a component solid state drive (e.g., 109).

The host interface 151 is configured to implement a solid state drive side of a communication protocol between host systems and solid state drives. Each of the drive interfaces 155 and 157 is configured to implement a host system side of a communication protocol between host systems and solid state drives. In some instances, the driver interfaces 155 to 157 can support different communication protocols (e.g., SATA and PCIe) such that the different types of component solid state drives 107 to 109 can be used.

The translation logic 153 is configured to receive a command from the host interface 151 and generate one or more commands for the drive interfaces 155 to 157. When one or more corresponding responses are received from the drive interfaces 155 to 157, the translation logic 153 generates a response to the command from the host interface 151.

The drive aggregator 103 has an address map 159 that controls the operation of the translation logic 153. For example, the address map 159 can be used to translate a logical address in the capacity of the virtualized single solid state drive 101 to the corresponding logical address in the capacity of a corresponding component solid state drive (e.g., 107 or 109) connected to one of the drive interfaces 155 to 157. Based on the address translation, the translation logic 153 can generate corresponding commands for the respective drive interfaces (e.g., 155 or 157).

In some implementations, the communication protocols used in the connection 135 and in the connection 137 are different. Thus, the translation logic 153 performs the command translations according to the differences in the communication protocols.

In some implementations, the communication protocols used in the connection 135 and in the connection 137 are different; and the translation logic 153 can simply forward a command received in the connection 135 to the drive interface 157. For example, when a namespace is created on the component solid state drive (e.g., 109) connected to drive interface 157, a command from the host interface 151 for read or write operations in the namespace can be forward to the drive interface 157.

The translation logic 153 can be implemented as a field programmable gate array (FPGA), an application specific integrated circuit (ASIC), or one or more microprocessors executing a set of instructions. The instructions and/or the address map 159 can be stored in a local memory unit of the drive aggregator 103. Alternatively, or in combination, the instructions and/or the address map 159 can be stored in one or more of the component solid state drives (e.g., 107 to 109) connected to the drive interfaces 155 to 157.

Figure 4:
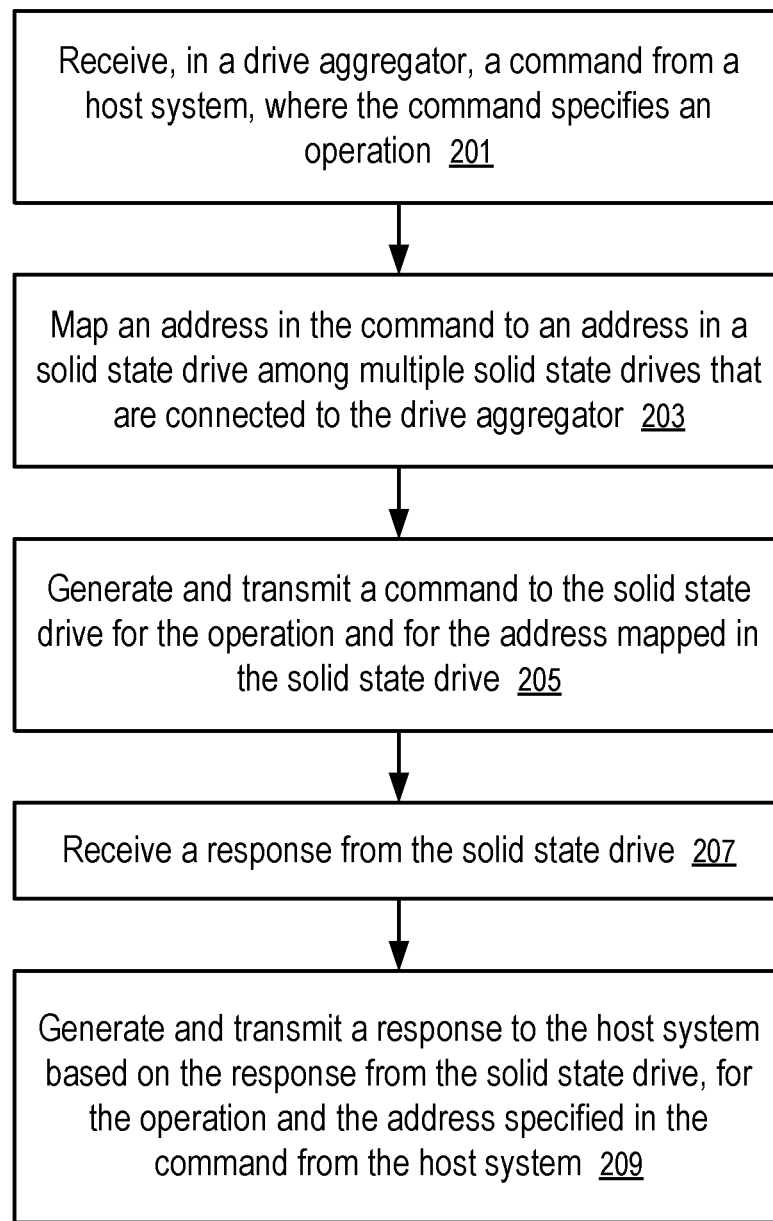
FIG. 4 shows a method implemented in a drive aggregator according to one embodiment.

FIG. 4 shows a method implemented in a drive aggregator 103 according to one embodiment. For example, the method of FIG. 4 can be implemented in the drive aggregator 103 illustrated in FIGS. 1, 2, and/or 3.

At block 201, a drive aggregator 103 receives a command from a host system 111. The command specifies an operation to be performed by a solid state drive 101. The drive aggregator 103 functions as the controller of a single solid state drive 101 to the host system 111. Thus, the commands from the host systems 111 to the drive aggregator are configured as being addressed to the same solid state drive 101. The drive aggregator 103 is connected to multiple solid state drives 107 to 109.

At block 203, the drive aggregator 103 maps an address in the command from the host system 111 to an address in a solid state drive (e.g., 107 or 109) among multiple solid state drives 107 to 109 that are connected to the drive aggregator 103. The mapping can be based on a namespace specified in the command from the host system 111, a predetermined address mapping scheme, and/or an address map 159.

At block 205, the drive aggregator 103 generates and transmits a command to the solid state drive (e.g., 107 or 109). The command to the solid state drive (e.g., 107 or 109) is configured for the operation specified in the command received from the host system 111 and for the address mapped in the solid state drive (e.g., 107 or 109).

For example, a logical address defined in a namespace created in the memory capacity of the single solid state drive 101 can be mapped to the same logical address defined in the namespace created in the memory capacity of a solid state drive (e.g., 107 or 109) that is assigned to implement the namespace.

For example, the space of logical addresses defined in the entire memory capacity of the single solid state drive 101 represented by the drive aggregator 103 can be divided into regions (e.g., according to a predefined scheme). Different regions can be mapped to the spaces of logical addresses defined in the memory capacities of the component solid state drives 107 to 109.

When the communication protocol between the host system 111 and the drive aggregator 103 is different from the communication protocol between the drive aggregator 103 and the component solid state drives 107 to 109, the drive aggregator 103 can perform the command translation according to the communication protocols.

When the communication protocol between the host system 111 and the drive aggregator 103 is same as the communication protocol between the drive aggregator 103 and the component solid state drives 107 to 109, the drive aggregator 103 can be configured to forward the command to the target solid state drive 101 without changes in some implementations (e.g., when the address mapping is based on namespace).

For example, the communication protocol between the host system 111 and the drive aggregator 103 and the communication protocol between the drive aggregator 103 and the component solid state drives 107 to 109 can each be any one of standard protocols, such as a protocol for a serial advanced technology attachment (SATA) interface, a protocol for a peripheral component interconnect express (PCIe) interface, a protocol for a universal serial bus (USB) interface, a protocol for a fibre channel, etc.

At block 207, the drive aggregator 103 receives a response from the solid state drive (e.g., 107 or 109) that is responsive to the command to the solid state drive (e.g., 107 or 109).

At block 209, the drive aggregator 103 generates and transmits a response to the host system 111 based on the response from the solid state drive (e.g., 107 or 109), where the response to the host system is responsive to the command from the host system for the operation and the address specified in the command from the host system.

In some implementations, the drive aggregator 103 performs protocol translation to account for the protocol differences between the connection 135 to the host system 111 and the connection (e.g., 137) to the component solid state drive (e.g., 109). In other implementations, the drive aggregator 103 performs further adjust for the response to the host system 111 to account for the logical address differences between the command from the host system 111 and the command to the component solid state drive (e.g., 109).

Figure 5:
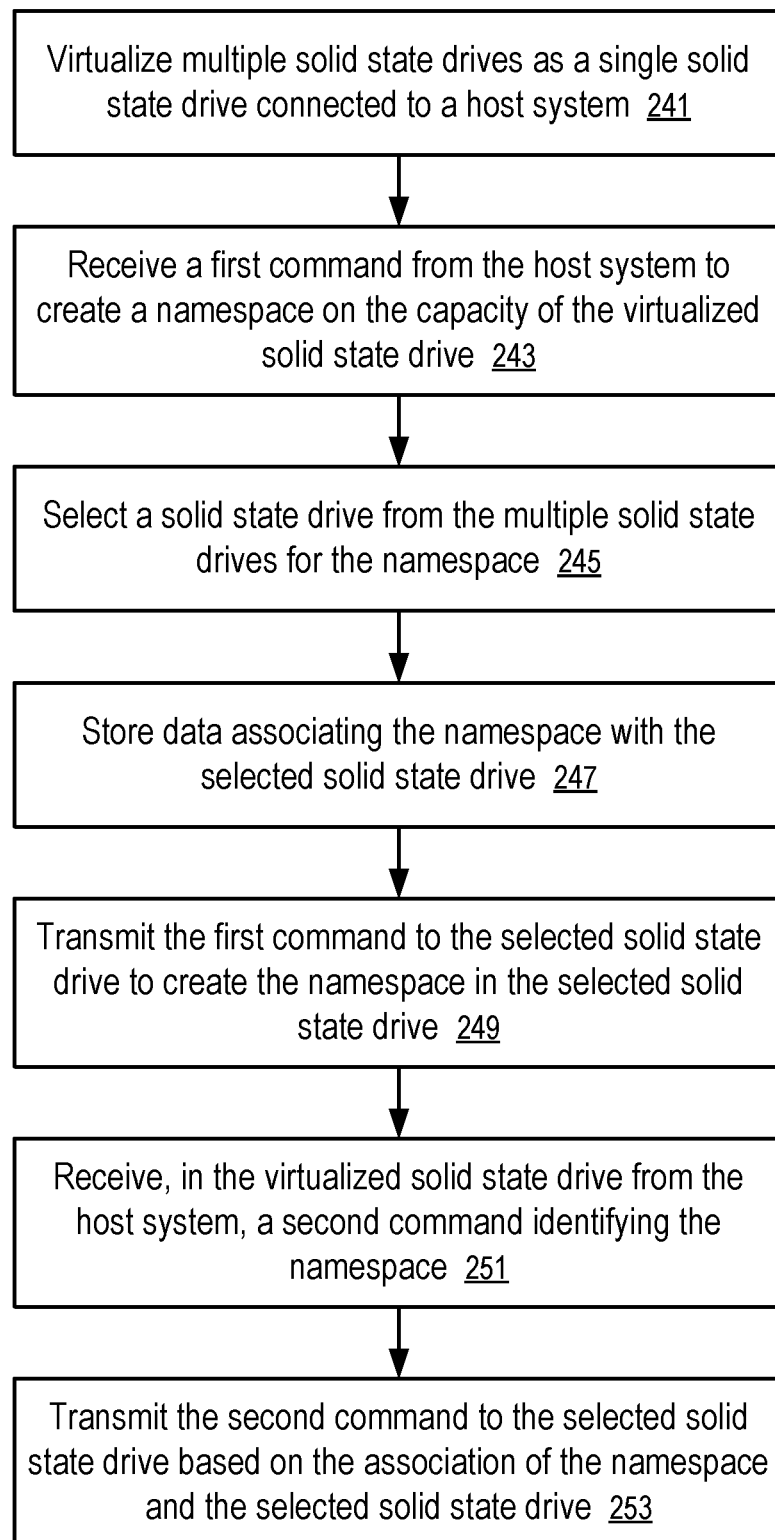
FIG. 5 shows a method of distributing commands received in a virtualized solid state drive to solid state drives.

FIG. 5 shows a method of distributing commands received in a virtualized solid state drive to solid state drives. For example, the method of FIG. 5 can be implemented in a virtualized solid state drive 101 of FIG. 1 having component solid state drives 107 to 109 in a configuration illustrated in FIG. 2. For example, the method of FIG. 5 can be implemented in the drive aggregator 103 illustrated in FIGS. 1, 2, and/or 3.

At block 241, a drive aggregator 103 virtualizes multiple solid state drives 107 to 109 as a single solid state drive 101 connected to a host system 111.

At block 243, the drive aggregator 103 receives a first command from the host system 111 to create a namespace on the capacity of the virtualized solid state drive 101.

At block 245, the drive aggregator 103 selects a solid state drive (e.g., 107 or 109) from the multiple solid state drives 107 to 109 for the namespace.

At block 247, the drive aggregator 103 stores data associating the namespace with the selected solid state drive (e.g., 107 or 109).

At block 249, the drive aggregator 103 transmits the first command to the selected solid state drive (e.g., 107 or 109) to create the namespace in the selected solid state drive (e.g., 107 or 109).

At block 251, the drive aggregator 103 receives from the host system 111 a second command identifying the namespace.

At block 253, the drive aggregator 103 transmits the second command to the selected solid state drive (e.g., 107 or 109) based on the association of the namespace and the selected solid state drive.

The technique of distributing commands to component solid state drives 107 to 109 as in FIG. 5 can simplify the translation logic 153 of the drive aggregator 103 and thus reduces the complexity, energy consumption, and cost of the translation logic 153.

In some embodiments disclosed herein, a single solid state drive is configured with multiple physical host interfaces that allow multiple host systems to access the memory/storage capacity of the solid state drive. In some implementations, a host system can use multiple parallel and/or redundant connections to the multiple physical host interfaces of the solid state drive for improved performance and/or reliability.

Figure 6:
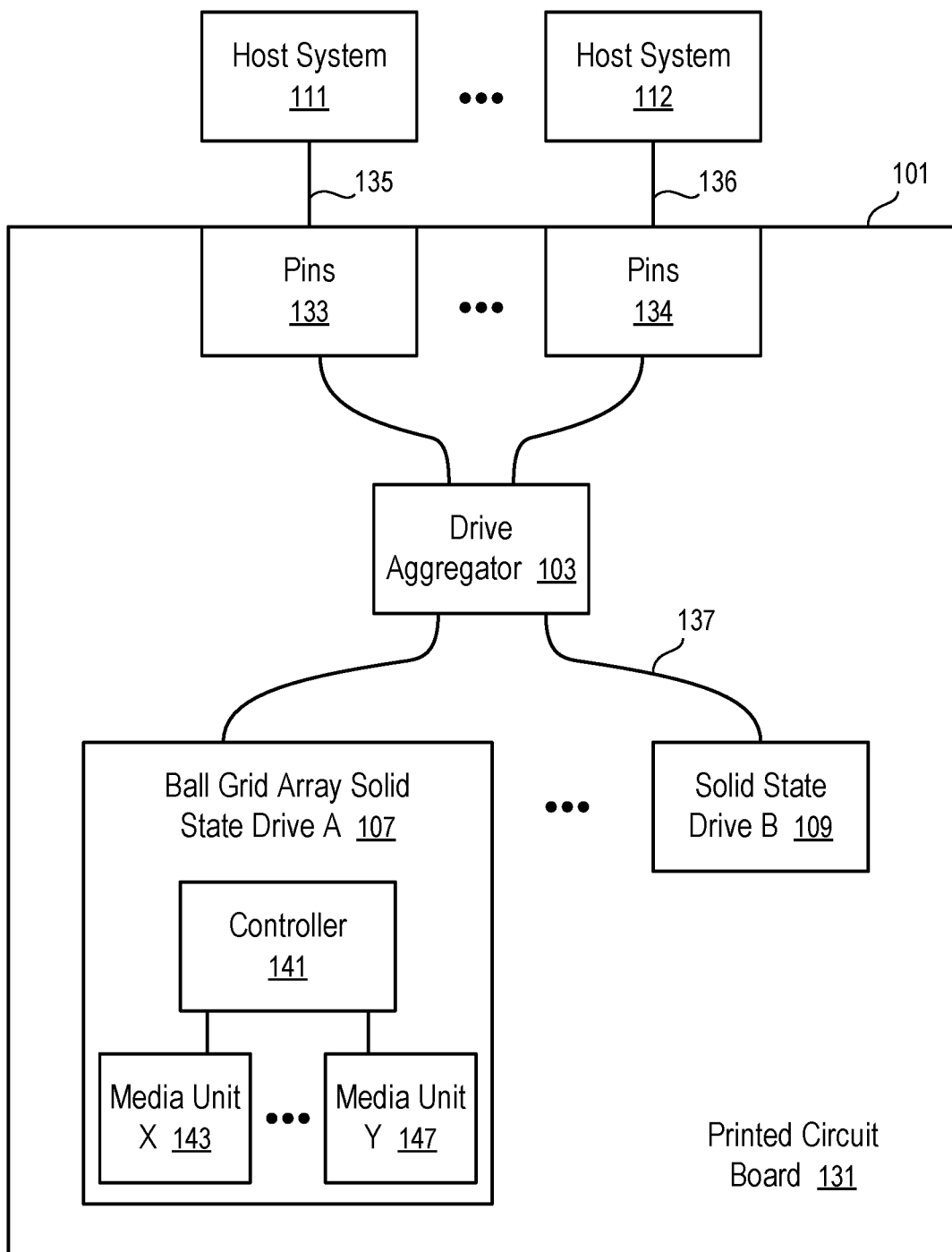
FIG. 6 shows multiple host systems connected to a virtualized single solid state drive having multiple component solid state drives.

FIG. 6 shows multiple host systems 111 to 112 connected to a virtualized single solid state drive 101 configured on a printed circuit board 131 with multiple component solid state drives 107 to 109.

Similar to the solid state drive 101 illustrated in FIG. 2, the solid state drive 101 illustrated in FIG. 6 can be constructed using multiple BGA SSDs (e.g., 107) as the component solid state drives 107 to 109. Each component solid state drive (e.g., 107) has a controller (e.g., 141) that is capable of servicing a host system (e.g., 111) directly without the drive aggregator 103, when the component solid state drive (e.g., 107) is connected directly to the host system (e.g., 111).

The drive aggregator 103 is configured to virtualize the memory/storage capacity of the set of component solid state drives 107 to 109 as the memory/storage capacity of a single virtualized solid state drive 101 and as a uniform memory/storage resource for the host systems 111 to 112.

The printer circuit board 131 is configured with multiple sets of pins 133 to 134. Each set of pins (e.g., 133 or 134) is sufficient to establish a connection between a host system (e.g., 111 or 112) and the solid state drive 101 for full access to the solid state drive 101. For example, a host system (e.g., 111 or 112) can transmit commands or requests to the solid state drive 101 using any pin set (e.g., 133 or 134) and receive responses to the respective commands or requests.

The multiple sets of pins 133 to 134 allow the host systems 111 to 112 in FIG. 6 to communicate with the solid state drive 101 using the parallel connections 135 to 136 respectively. For example, the host system 111 can send a command/request to the solid state drive 101 through the connection 135 and the pins 133, while concurrently the host system 112 can send a similar command/request (or a command/request of a different type) to the solid state drive 101 through another connection 136 and the alternative pins 134. For example, the host system 111 can send a write command at the same time as the host system 112 is sending a write command or a read command to the solid state drive 101. Thus, the host systems 111 to 112 can share the memory/storage resources offered by the solid state drive 101 as a whole.

The drive aggregator 103 of FIG. 6 can service the commands/requests from each host system (e.g., 111 or 112) in a way similar to the drive aggregator 103 illustrated in and described with FIGS. 2-5.

In some instances, when two concurrent commands are mapped to a same component solid state drive (e.g., 107 or 109) for execution, the drive aggregator 103 of FIG. 6 can further resolve the conflict by scheduling the commands for non-concurrent execution, as further discussed below.

Figure 7:
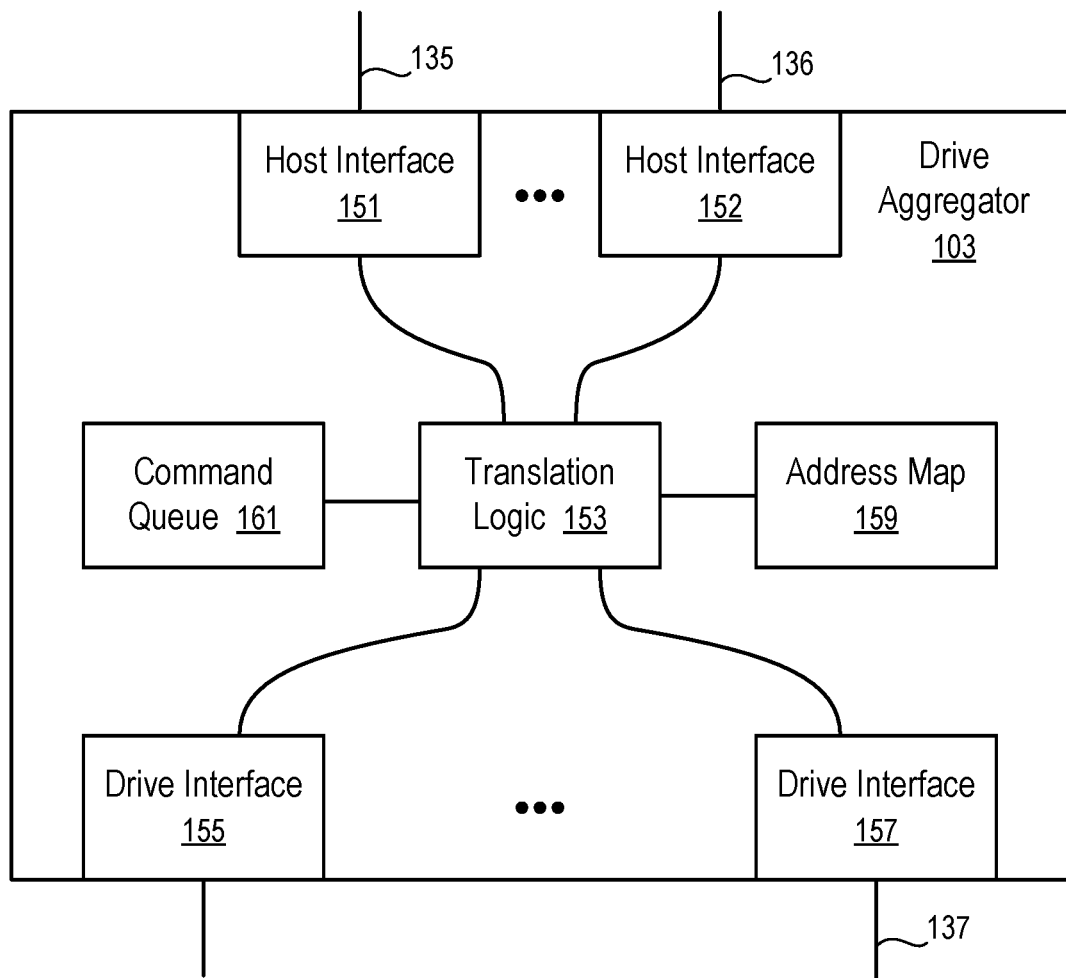
FIG. 7 shows a drive aggregator having multiple host interfaces according to one embodiment.

FIG. 7 shows a drive aggregator 103 having multiple host interfaces 151 to 152 according to one embodiment. For example, the drive aggregator 103 of FIG. 7 can be used in the solid state drive 101 of FIG. 8.

The translation logic 153 of FIG. 7 can distribute commands received in a host interface (e.g., 151 or 152) to the drive interfaces 155 to 157 based on an address map 159, in a way similar to the translation logic 153 of FIG. 3.

Further, when multiple commands are received concurrently in multiple host interfaces 151 to 152, the operations of the commands may be mapped to different drive interfaces in some situations and mapped to a same drive interface in other situations. For example, when the multiple commands are configured to operate on logical addresses associated with the same drive interface 155, a conflict occurs. The conflict prevents the translation logic 153 from executing the commands concurrently using the drive interfaces in parallel. In such a situation, the translation logic 153 can use a command queue 161 to schedule the sequential execution of the commands to avoid conflicts.

When there is no conflict, multiple commands received concurrently in multiple host interfaces 151 to 152 can be executed in parallel by separate component solid state drives (e.g., 107 to 109) that are connected to the drive interfaces 155 to 157 respectively. The execution can be performed via generating the respective commands for the component solid state drives (e.g., 107 to 109) in some implementations, or via forwarding the received commands to the respective drive interfaces 155 to 157.

When there is a conflict, the translation logic 153 can use the command queue 161 to schedule sequential execution of conflicting commands received from different host interfaces 151 to 152. For example, when two commands received in the host interfaces 151 and 152 identify a same namespace (or a logical address region) that is associated with the drive interface 155 according to the address map 159, the translation logic 153 can queue one of the commands in the command queue 161 and forward the other command to the drive interface 155 (or generate and transmit a corresponding command for the operation of the other command after proper protocol and/or address translation). Subsequently, the translation logic 153 can retrieve the remaining command from the command queue 161 and forward it to the drive interface (or generate and transmit a corresponding command for the operation of the command retrieved from the command queue after proper protocol and/or address translation).

In some implementations, the translation logic 153 supports executions of commands received from a host interface (e.g., 151 or 152) out of the order in which the commands are received from the host interface (e.g., 151 or 152). The translation logic 153 can arrange the execution orders of commands via the command queue to increase parallel transmissions of commands to the drive interfaces 155 to

157 and thus improve the overall performance of the solid state drive 101 having the drive aggregator 103.

In some instances, two or more of the host interfaces 151 to 152 can be used by a same host system for increased communication bandwidth to the drive aggregator and/or improved reliability in connection to the drive aggregator.

Figure 8:
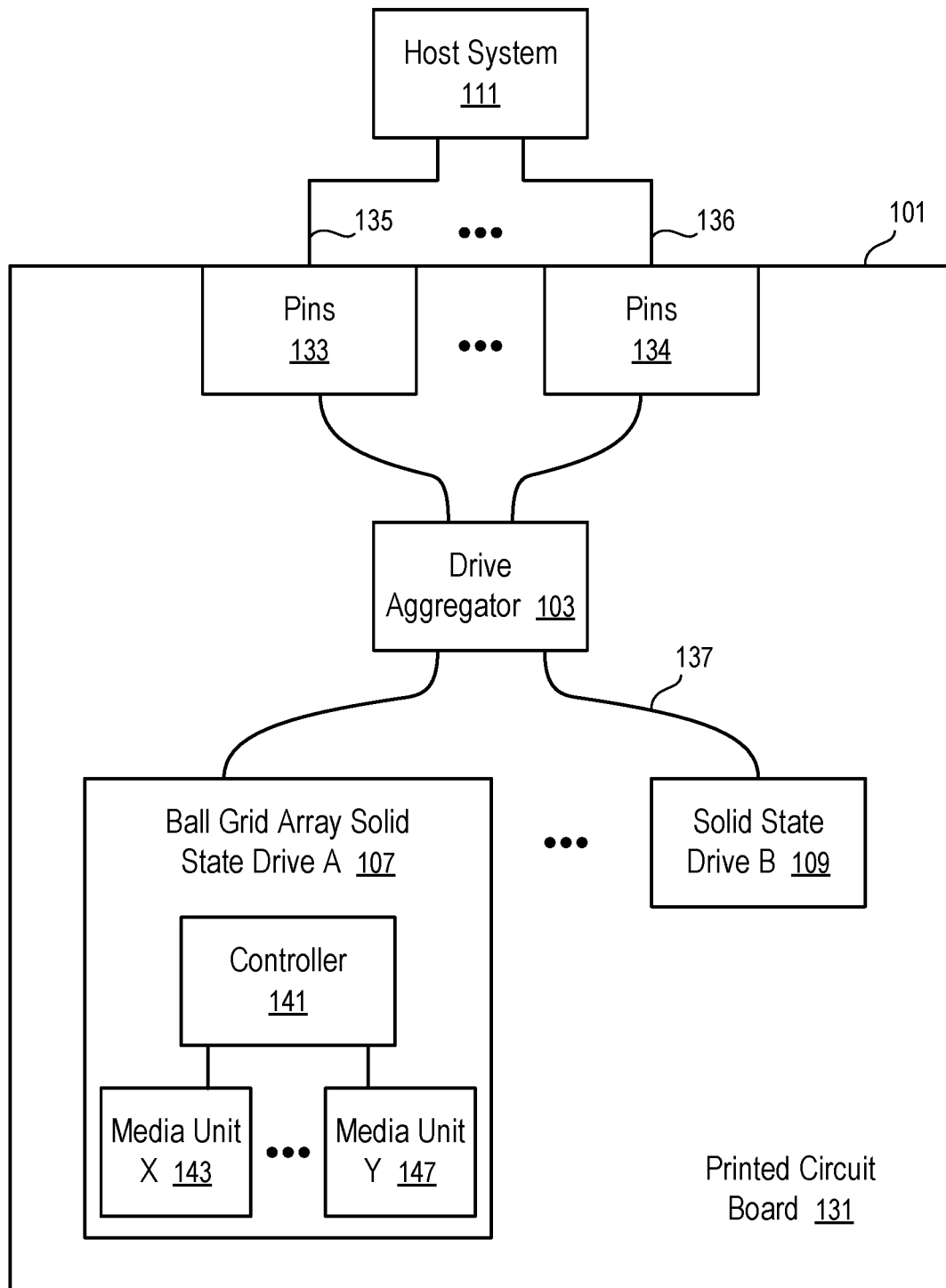
FIG. 8 shows a host system connected to a virtualized single solid state drive via multiple parallel and/or redundant connections.

FIG. 8 shows a host system 111 connected to a virtualized single solid state drive 101 via multiple parallel and/or redundant connects 135 to 136. For example, the virtualized single solid state drive 101 of FIG. 8 can be implemented in a way similar to the virtualized single solid state drive 101 of FIG. 6 using a drive aggregator 103 of FIG. 7.

In FIG. 8, the virtualized single solid state drive 101 has multiple sets of pins 133 to 134 that may be connected to separate host systems in a way as illustrated in FIG. 7. In the example of FIG. 8, the multiple sets of pins 133 to 134 of the solid state drive 101 are connected via parallel, redundant connections to a same host system 111. Thus, the host system 111 can use any of the connections to send a specific command to the solid state drive 101 (e.g., to write/store data in memory cells or read/retrieve data from memory cells).

For example, when one of the connections (e.g., 135 or 136) is damaged, the host system 111 can use the remaining connections (e.g., 136 or 135) to access the memory/storage capacity of the solid state drive 101. Thus, the reliability of the system is improved.

Further, the host system 111 can send multiple commands in parallel via the connections 135 to 136 to the solid state drive 101 for execution. For example, the host system 111 can send a read command via the connection 135 while sending a write command via the connection 136 concurrently. For example, the host system 111 can use the connection 135 for a read stream of data stored into a namespace that is configured on the component solid state drive 107, while concurrently using the connection 136 for a write stream of data retrieved from another namespace that is configured on another component solid state drive 109.

Figure 9:
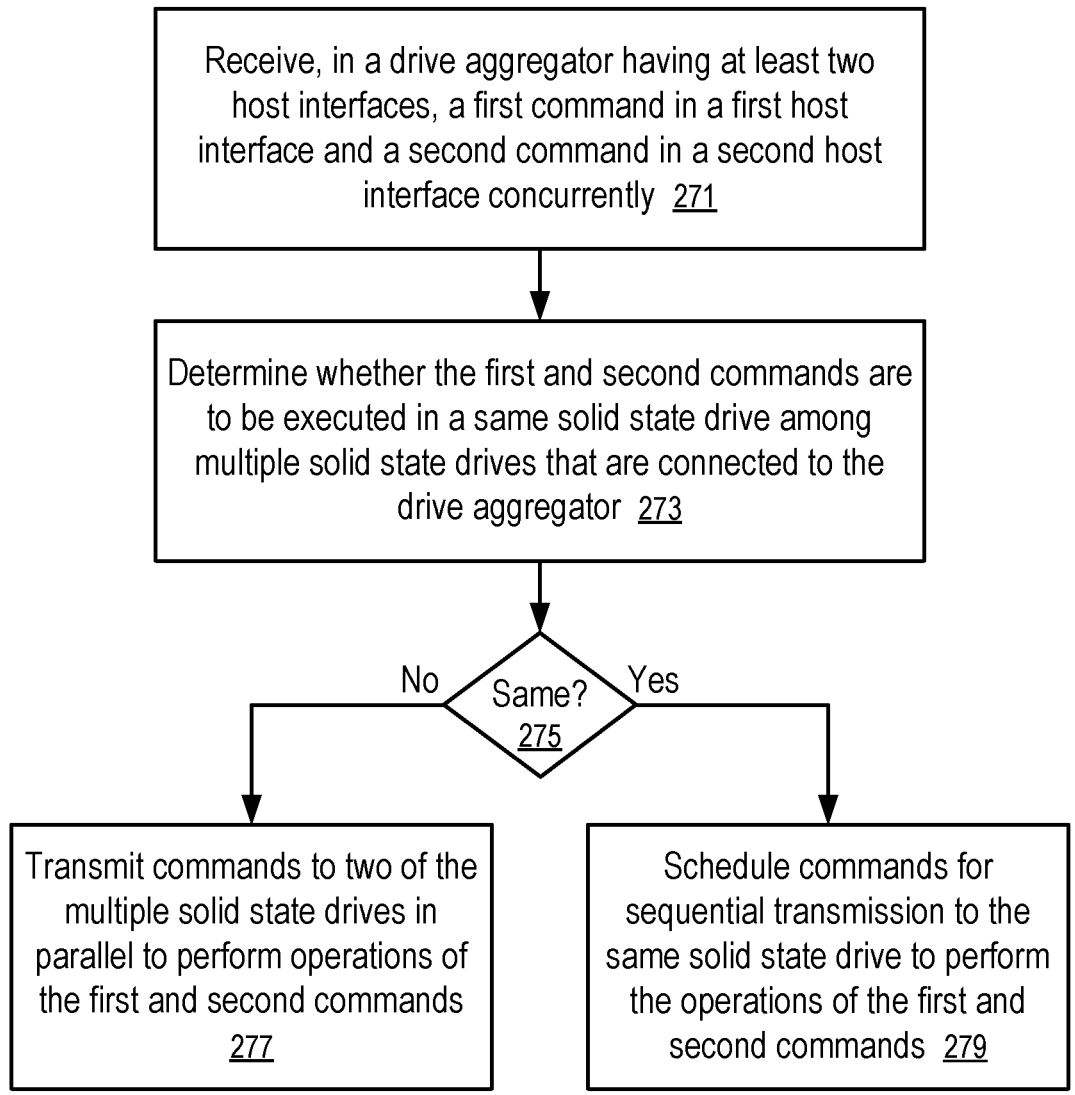
FIG. 9 shows a method of processing commands received in a virtualized solid state drive via multiple host interfaces.

FIG. 9 shows a method of processing commands received in a virtualized solid state drive 101 via multiple host interfaces 151 to 152. For example, the method of FIG. 9 can be implemented in a virtualized solid state drive 101 of FIG. 1 having component solid state drives 107 to 109 in a configuration illustrated in FIG. 6 or 8. For example, the method of FIG. 9 can be implemented in the drive aggregator 103 illustrated in FIGS. 6, 7, and/or 8. Further, the method of FIG. 9 can be used in combination with the method of FIGS. 4 and/or 5.

At block 271, a drive aggregator 103 having at least two host interfaces (e.g., 151 and 152) receives concurrently a first command in a first host interface (e.g., 151) and a second command in a second host interface (e.g., 152).

At block 273, the translation logic 153 of the drive aggregator 103 determines whether the first and second commands are to be executed in a same solid state drive (e.g., 107 or 109) among multiple solid state drives 107 to 109 that are connected to the drive aggregator 103 through the drive interfaces 155 to 157 of the drive aggregator 103.

At block 275, a determination that the first and second commands are to be executed in a same solid state drive (e.g., 107 or 109) leads to block 279; and a determination that the first and second commands are to be executed in different solid state drives (e.g., 107 and 109) leads to block 277.

For example, for each respective command in the first and second commands received in the host interfaces (e.g., 151 and 152), the translation logic 153 can determine the memory cells to be operated upon. For example, the memory cells can be operated upon for reading data or for writing data according to the logical addresses specified in respective commands. When the memory cells are determined to be in the component solid state drive (e.g., 107 or 109) connected to a drive interface (e.g., 155 or 157), the respective command is to be executed in the component solid state drive (e.g., 107 or 109). For example, the identification of the component solid state drive (e.g., 107 or 109) can be made using an address map 159, based on the logical address of the memory cells specified in the respective command and/or the namespace of the logical address (e.g., as discussed above in connection with FIGS. 4 and 5). When each command is mapped to a component solid state drive (e.g., 107 or 109), multiple concurrent commands may be mapped to a same component solid state drive (e.g., 107 or 109) in some instances, and not mapped to any same component solid state drive (e.g., 107 or 109) in other instances.

At block 277, the translation logic 153 transmits commands to two of the multiple solid state drives 107 to 109 in parallel to perform operations of the first and second commands, since the first and second commands do not operate on the same component solid state drive (e.g., 107 or 109).

At block 279, the translation logic 153 schedules commands for sequential transmission to the same solid state drive (e.g., 107 or 109) to perform the operations of the first and second commands, because the first and second commands operate on the same component solid state drive (e.g., 107 or 109). The sequential transmission resolves the conflict.

Similar to the operations in FIGS. 4 and 5, the commands transmitted to the solid state drive(s) in parallel or in sequence to perform operations of the first and second commands can involve protocol translation and address translations.

For example, when the communication protocol on the host connections 135 to 136 is different from the communication protocol on the drive connections (e.g., 137), the translation logic 153 translates from the protocol for the first and second commands to the commands to the drive interfaces 155 to 157.

For example, when the communication protocol on the host connections 135 to 136 is the same as the communication protocol on the drive connections (e.g., 137) and the address map 159 is based on the association between namespaces and the component drives on which the namespaces are hosted, the translation logic 153 can simply forward the first and second commands as the respective commands to the drive interfaces 155 to 157.

For example, when the address map 159 is used to map LBA address regions in commands received in the host interfaces 151 to 152 to different LBA addresses in the component solid state drives 157 to 159, the translation logic 153 can replace the LBA addresses in the commands received in the host interfaces 151 to 152 with mapped LBA addresses computed according to the address map 159 for the respective component solid state drives 157 to 159.

In some embodiments disclosed herein, a virtualized single solid state drive having multiple component solid state drives is configured to optimize memory/storage access differently for different datasets. For example, one dataset can be stored in the virtualized single solid state drive in a way that is optimized for read operations (e.g., for storing instructions or codes to be executed in a host system); another dataset can be stored in the virtualized single solid state drive in a way that is optimized for write operations (e.g., for storing log data); a further dataset can be stored in the virtualized single solid state drive in a way that is optimized for the endurance of the memory cells being used (e.g., for storing data that changes frequently); and a yet further dataset can be stored in the virtualized single solid state drive in a way that is optimized for the reliability of the data being retrieved (e.g., for storing mission critical data/code). For example, a host system connected to the virtualized single solid state drive can create different namespaces for different datasets and indicate the desired access optimizations for the respective namespaces. A drive aggregator of the virtualized single solid state drive can implement the optimizations by mapping the namespaces to differently optimized component solid state drives. In some instances, the drive aggregator can use multiple component solid state drives to implement a namespace with a particular optimization. Optionally, the drive aggregator detects automatically the data usage patterns of the namespaces and then implements automatically the optimizations for the data usage patterns via remapping the namespaces in the component solid state drives and/or reconfiguring the component solid state drives.

Figure 10:
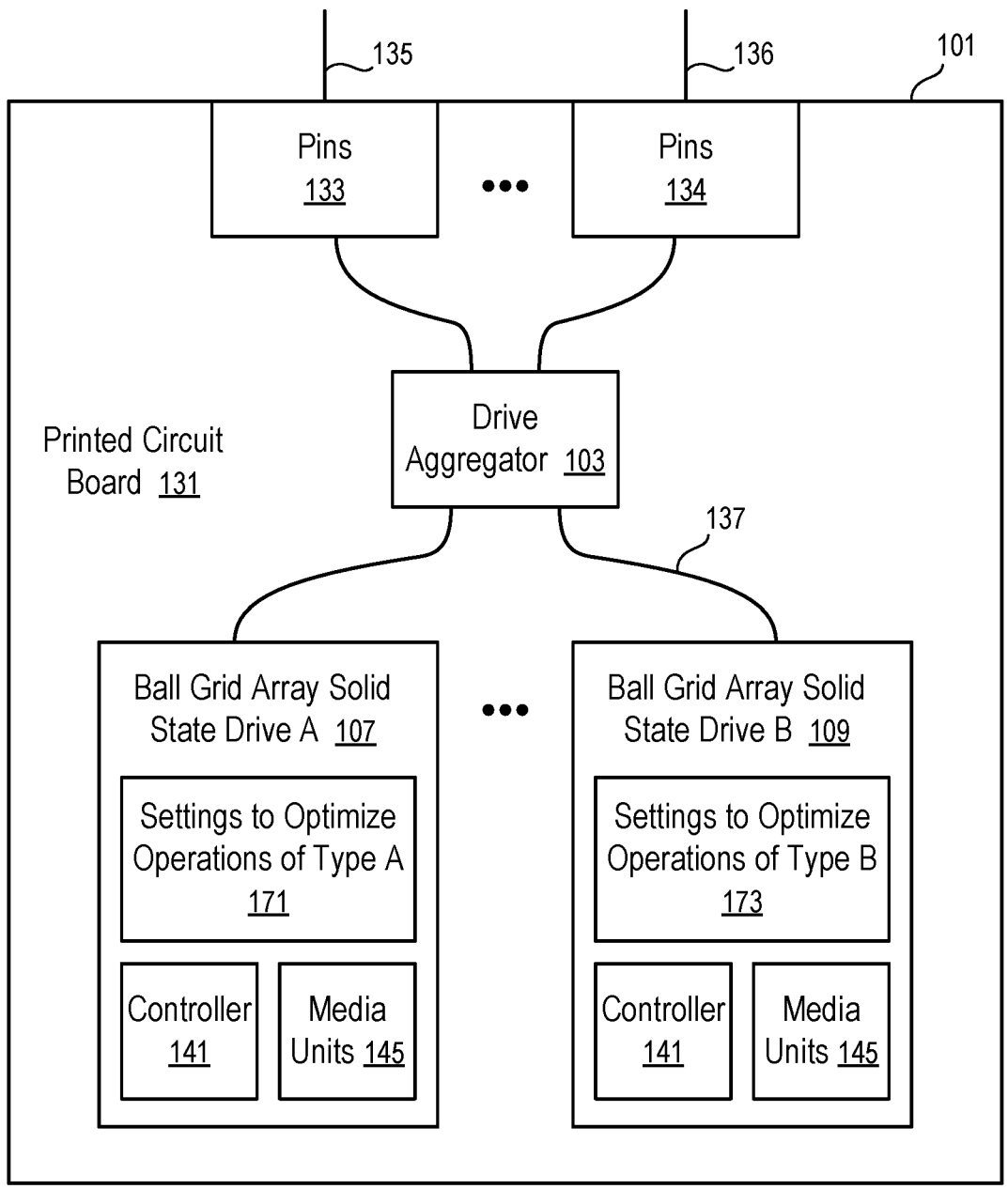
FIG. 10 shows a virtualized single solid state drive having access optimization according to one embodiment.

FIG. 10 shows a virtualized single solid state drive 101 having access optimization according to one embodiment.

In the solid state drive 101 of FIG. 10, the component solid state drives 107 to 109 are separately optimized for different types of operations.

For example, one of the component solid state drives 107 to 109 can be optimized for read operations, which is suitable for storing instructions or codes to be executed in a host system; another of the component solid state drives 107 to 109 can be optimized for write operations, which is suitable for storing log data; a further one of the component solid state drives 107 to 109 can be optimized for endurance, which is suitable for storing data that changes frequently; and a yet further the component solid state drives 107 to 109 can be optimized for the reliability of the data being retrieved, which is suitable for storing mission critical data/code.

In some implementations, the component solid state drives 107 to 109 are pre-configured and/or hardwired for various types of optimizations of memory/storage operations and/or usages. The optimizations may not be changed dynamically by the drive aggregator 103. For examples, the media units 145 in different component solid state drives 107 to 109 can be implemented using different memory technologies for the access optimizations. For examples, the different component solid state drives 107 to 109 can have different internal structures and/or controllers 141 to achieve different ways of optimizations.

In some implementations, the component solid state drives 107 to 109 are optimized at least in part via different optimization settings 171 to 173. In some instances, the settings 171 to 173 can be configured and/or changed by the drive aggregator 103. Thus, the component solid state drives 107 to 109 can be optimized after the solid state drive 101 is connected to one or more host systems 111 to 112. Further, the drive aggregator 103 can adjust the optimization settings for further optimizations based on actual memory/storage usages reflected in the commands received via the pins 133 to 134 of the solid state drive 101.

In some implementations, the component solid state drives 107 to 109 can be identical when the solid state drive 101 is initially connected to a host system (e.g., 111 or 112). The host system can send commands to the solid state drive 101; and in response, the drive aggregator 103 configures the optimization parameters 107 to 109 of the solid state drives to optimize the memory operations for different datasets identified via logical address regions and/or namespaces.

For example, the optimization settings 107 to 109 can include the identifications of memory programming modes. For example, when a memory cell is programmed in an SLC (single level cell) mode, the memory cell stores one bit of information; when the memory cell is programmed in an MLC (multi-level cell) mode, the memory cell stores two bits of information; when the memory cell is programmed in a TLC (triple level cell) mode, the memory cell stores three bits of information; and when the memory cell is programmed in a QLC (quad-level cell) mode, the memory cell stores four bits of information. Different programming modes offer different trade-offs in access performance, endurance, storage capacity, reliability, etc.

For example, the optimization settings 107 to 109 can include the identifications of data programming techniques. For example, data can be programmed into a media unit 145 using a single-plane programming technique or a multi-plane programming technique. For example, data can be programmed into a media unit 145 using a single-pass programming technique, or a multi-pass programming technique. In some instances, a component solid state drive (e.g., 107 or 109) offers multiple options for multi-pass programming and/or multiple options for multi-plane programming. Different programming options and/or techniques can offer different trade-offs in access performance, endurance, storage capacity, and/or reliability, etc.

The drive aggregator 103 can optimize different datasets by hosting the datasets in differently optimized component solid state drives. For example, a host system 111 can send a command to the solid state drive to create a namespace for storing data in the namespace. The command can identify or indicate an optimization preference for the namespace. Based on the optimization preference, the drive aggregator 103 can select a component solid state drive (e.g., 107 or 109) having the corresponding optimization, and create the namespace in the selected component solid state drive (e.g., 107 or 109). The drive aggregator 103 stores an address map 159 that associates the namespace with the selected component solid state drive (e.g., 107 or 109) such that subsequent commands directed to the namespace is forwarded to the selected component solid state drive (e.g., 107 or 109).

In some instances, the host system 111 can send a command to the solid state drive to create a namespace without indication of an optimization preference for the namespace. The drive aggregator 103 can assign a default preference for the namespace and create the namespace in a component solid state drive (e.g., 107 or 109) according to the default preference and/or other considerations (e.g., availability and/or load balance). Subsequently, the drive aggregator 103 can monitor the usages of the namespace to detect a pattern. Based on the usage pattern, the drive aggregator 103 can assign an updated preference for the namespace and move the namespace to a component solid state drive (e.g., 107 or 109) according to the updated preference and/or other considerations (e.g., availability and/or load balance).

For example, to move a namespace from a source component solid state drive 107 to a destination component solid state drive 109, the drive aggregator 103 can generate commands to the source component solid state drive 107 to retrieve data from the namespace and generate commands to the destination component solid state drive 109 to store the retrieved data.

During the time period of copying the namespace from the source component solid state drive 107 to the destination component solid state drive 109, the drive aggregator 103 can forward a command at a logical address in the namespace (e.g., a write or delete command) from the host system(s) to one of the source and destination component solid state drives 107 and 109, based on the progress of the copying of the namespace. If the data at the logical address in the namespace has not yet been copied to the destination component solid state drive 109, the command is forwarded to the source component solid state drive 107. If the data at the logical address in the namespace has been copied to the destination component solid state drive 109, the command is forwarded to the destination component solid state drive 109.

After the copying of the namespace from the source component solid state drive 107 to the destination component solid state drive 109, the drive aggregator 103 can update the address map to associate the namespace with the destination component solid state drive 109 without associating the namespace with the source component solid state drive 107.

FIG. 10 illustrates an example where the virtualized single solid state drive 101 has multiple sets of pins 133 to 134 for parallel and/or redundant connections 135 to 136, in a way like the drive 101 of FIG. 6 or 8. In general, it is not necessary to have multiple sets of pins 133 to 134 to implement the access optimization. For example, the optimization settings 107 to 109 can be implemented in the drive 101 of FIG. 2 that has one set of pins 133 for a connection 135 to one host system 111.

Figure 11:
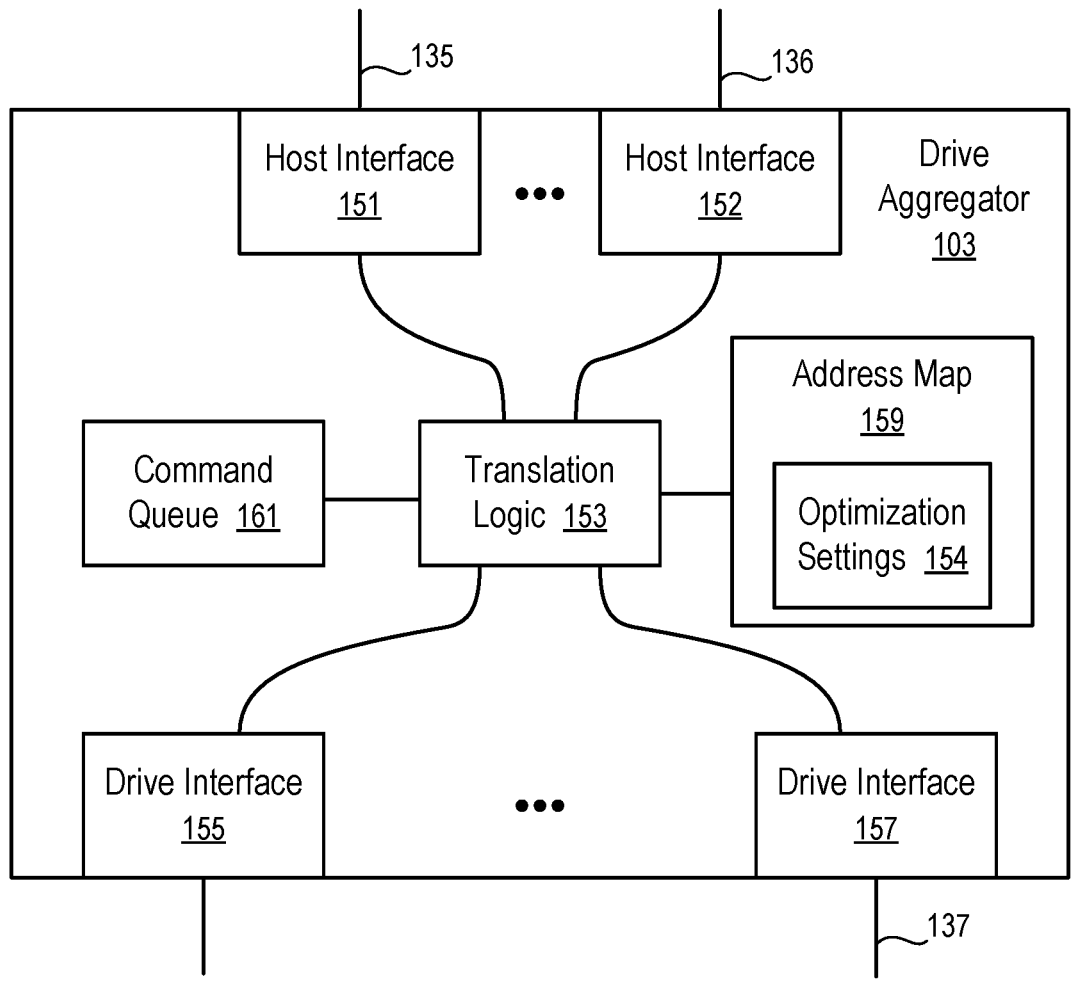
FIG. 11 shows a drive aggregator configured to optimize access to memory/storage in a virtualized single solid state drive according to one embodiment.

FIG. 11 shows a drive aggregator 103 configured to optimize access to memory/storage in a virtualized single solid state drive according to one embodiment. For example, the drive aggregator 103 of FIG. 11 can be used in the solid state drive 101 of FIG. 10.

FIG. 11 illustrates an example where the drive aggregator 103 has multiple host interfaces 151 to 152 for parallel and/or redundant connections 135 to 136, in a way like the drive aggregator 103 of FIG. 7. In general, it is not necessary to have multiple host interfaces 151 to 152. For example, the drive aggregator 103 of one embodiment having the access optimization capability can have only one host interface, in a way like the drive aggregator 103 of FIG. 3.

The translation logic 153 is configured to manage the address map 159 for mapping the logical addresses specified in the commands received in the host interfaces 151 to 152 to logical addresses for the solid state drives connected to the drive interfaces 155 to 157.

The address map 159 in FIG. 11 further includes optimization settings 154 that identify the optimization configurations of some of the logical addresses in the component solid state drives 107 to 109 connected to the drive interfaces 155 to 157. For example, the optimization settings 154 can be implemented by associating a drive interface with an optimization option; and different namespaces configured to use the optimization option are associated in the address map 159 with the drive interface.

In some instances, an optimization can be implemented via using more than one component solid state drive.

For example, multiple component solid state drives can be used to store a namespace in parallel such that the namespace is mirrored in the multiple component solid state drives. Thus, the reliability data stored in the namespace can be improved.

For example, multiple component solid state drives can be used to store a namespace in parallel such that parts of data of a command addressing the namespace is distributed in the multiple component solid state drives. Thus, since storing and/or retrieving parts of the data can be performed in parallel for the command using the multiple component solid state drive, the access performance/speed can be improved for the namespace.

For example, translation logic can use multiple component solid state drives to implement a RAID (redundant array of independent disks) operation for a namespace. The RAID operation can include the use of techniques of striping, mirroring, and/or parity for the namespace.

Figure 12:
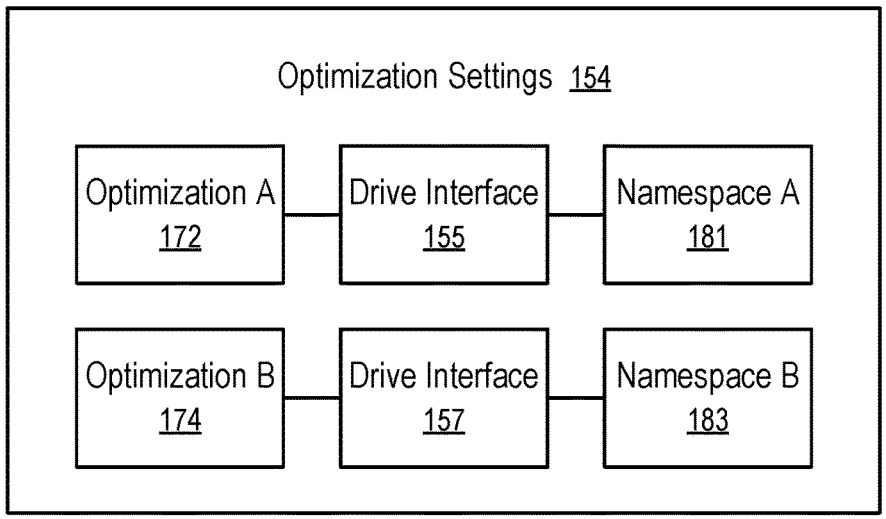
FIGS. 12-14 illustrate examples of optimization settings for a drive aggregator according to some embodiments.
Figure 13:
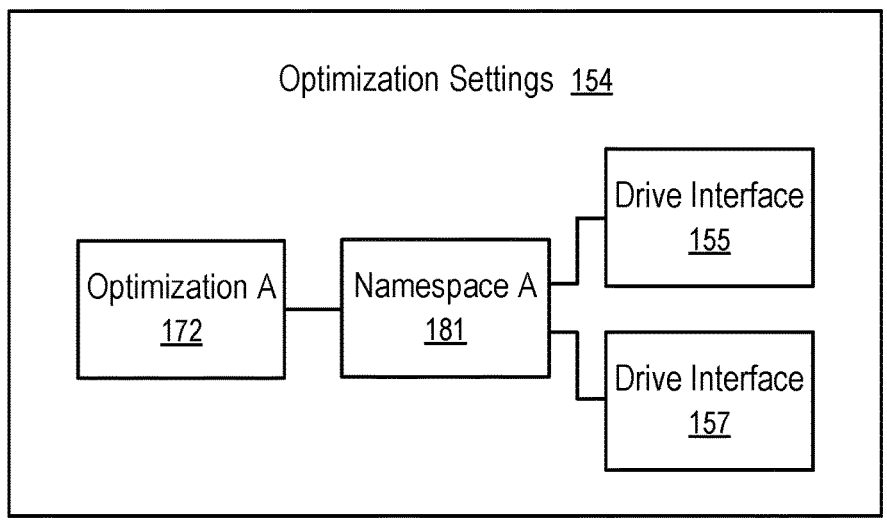
Figure 14:
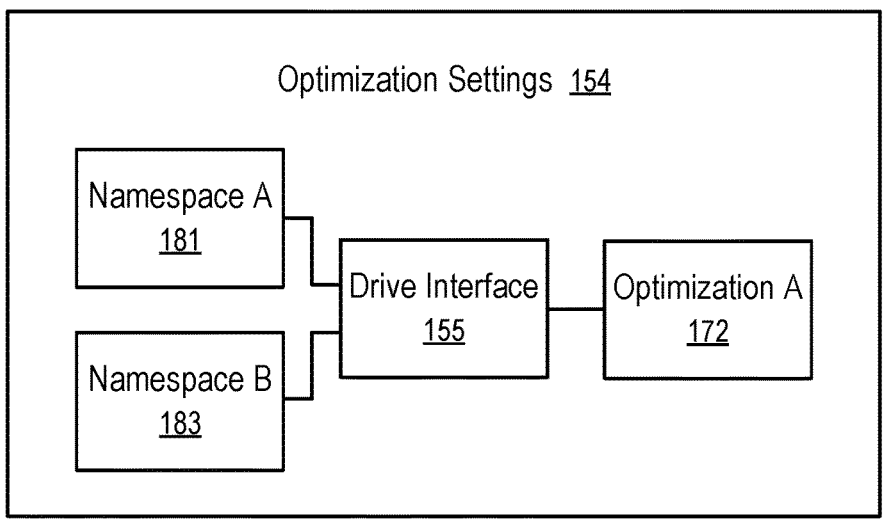

FIGS. 12-14 illustrate examples of optimization settings 154 for a drive aggregator 103 according to some embodiments. For example, the optimization settings 154 illustrated in FIGS. 12-14 can be used in the drive aggregator 103 of FIG.

In FIG. 12, drive interfaces 155 and 157 are associated with optimizations 172 and 174 respectively.

For example, component solid state drives 107 and 109 can be connected to the drive interfaces 155 and 157 respectively. The component solid state drives 107 and 109 can be hardwired for the optimizations 172 and 174 respectively; and the association between the drive interfaces 155 and 157 and the optimizations 172 and 174 indicates the optimized resources available to the drive aggregator 103.

Alternatively, or in combination, the component solid state drives 107 and 109 can be configured for the optimizations 172 and 174 respectively using at least in part the settings 171 and 173 illustrated in FIG. 10. The drive aggregator 103 can communicate the settings to the component solid state drives 107 and 109 to configure the optimizations 172 and 174.

When a host system (e.g., 111) requests a solid state drive 101 having the drive aggregator 103 to create a namespace A 181 that is be optimized according to the optimization A 172, the drive aggregator 103 selects the drive interface 155 for the namespace A 181 and sends a command to the component solid state drive 107 connected to the drive interface 155 to create the namespace A 181. The drive aggregator 103 associates the namespace A 181 with the drive interface 155 in the optimization settings 154 and/or the address map 159 to allow commands addressed to the namespace A 181 to be forwarded to the drive interface 155.

Similarly, when the host system (e.g., 111) requests the solid state drive 101 having the drive aggregator 103 to create a namespace B 183 that is be optimized according to the optimization B 174, the drive aggregator 103 selects the drive interface 157 for the namespace B 183 and sends a command to the component solid state drive 109 connected to the drive interface 157 to create the namespace B 183. The drive aggregator 103 associates the namespace B 183 with the drive interface 157 in the optimization settings 154 and/or the address map 159 to allow commands addressed to the namespace B 183 to be forwarded to the drive interface 157.

FIG. 13 illustrates an example where component solid state drives 107 and 109 connected to drive interfaces 155 and 157 are used together to implement the optimization A 172. For example, the namespace 181 can be mirrored in the component solid state drives 107 and 109 to improve the data reliability of in the namespace 181. Not all namespaces in the component solid state drive 107 are required to be mirrored in the drive interface 157. For example, when the namespace A 181 is mirrored in the component solid state drives 107 and 109 connected to drive interfaces 155 and 157 according to the optimization settings 154, another namespace can be created only in one of the component solid state drives 107 and 109.

The optimization A 172 identifies the operations to be performed by the translation logic 153 in command translations for the namespace A 181. For example, in response to receiving from a host system 111 a write command in the namespace A 181, the translation logic 153 forwards the write command to both the drive interface 155 and the drive interface 157. For example, in response to receiving from the host system 111 a read command in the namespace A 181, the translation logic 153 forwards the read command to both the drive interface 155 and the drive interface 157 and compares the results for one type of optimization, or forwards the read command to one of the drive interface 155 and the drive interface 157 that has the lowest workload in another type of optimization.

Similarly, the drive interfaces 155 and 157 can be used together to implement the optimization A 172 of a type where the data of the namespace A 181 is stripped for distribution of parts in parallel to the component solid state drives 107 and 109 that are connected to drive interfaces 155 and 157.

Similarly, multiple drive interfaces 155 to 157 can be used together to implement the optimization A 172 of a type where the data of the namespace A 181 is stored with parity data in the component solid state drives 107 to 109 that are connected to drive interfaces 155 to 157.

FIG. 14 illustrates an example where multiple namespaces 181 and 183 can be mapped to a same drive interface 155 for an optimization A 172 implemented in the component solid state drive 107 connected to the drive interface 155.

Similarly, multiple namespaces can be mapped to a set of interfaces that are used together to implement an optimization.

Figure 15:
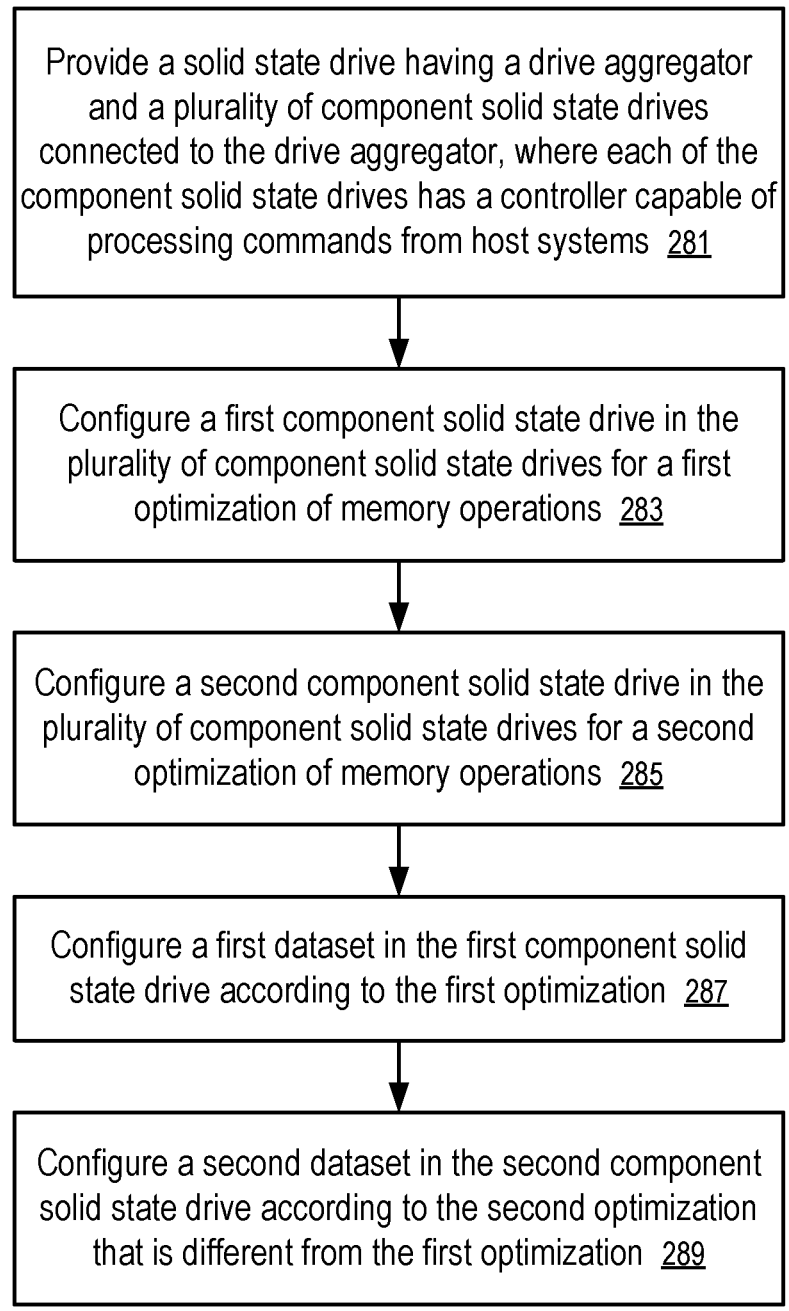
FIG. 15 shows a method of access optimization in a virtualized solid state drive.

FIG. 15 shows a method of access optimization in a virtualized solid state drive. For example, the method of FIG. 15 can be implemented in a virtualized solid state drive 101 of FIG. 1 having component solid state drives 107 to 109 in a configuration illustrated in FIG. 2, 6, 8, or 10. For example, the method of FIG. 15 can be implemented in the drive aggregator 103 illustrated in FIGS. 2-3, 6-8, 10, and/or 11 with optimization settings 154 illustrated in FIGS. 12, 13, and/or 14. Further, the method of FIG. 15 can be used in combination with the method of FIGS. 4, 5, and/or 9.

At block 281, a solid state drive 101 is provided to have a drive aggregator 103 and a plurality of component solid state drives 107 to 109 that are connected to the drive aggregator 103. Each of the component solid state drives 107 to 109 has a controller 141 capable of processing commands from host systems (e.g., 111, 112).

At block 283, the drive aggregator 103 configures a first component solid state drive (e.g., 107) in the plurality of component solid state drives 107 to 109 for a first optimization (e.g., 172) of memory operations. For example, the first component solid state drive (e.g., 107) can be configured to optimize frequent reads with reduced latency. Alternatively, the first component solid state drive (e.g., 107) can be configured to optimize for improved performance in sequential reads (or random reads). Alternatively, the first component solid state drive (e.g., 107) can be configured to optimize for improved performance in sequential writes (or random writes). Alternatively, the first component solid state drive (e.g., 107) can be configured to optimize for improved endurance of memory cells subjecting to repeated program/erase cycles. Alternatively, the first component solid state drive (e.g., 107) can be configured to optimize for increased storage capacity for data that does not change frequently. Alternatively, the first component solid state drive (e.g., 107) can be configured to optimize for reduced sensitivity to operating temperature of the solid state drive 101. Alternatively, the first component solid state drive (e.g., 107) can be configured to optimize for reduced error rates.

At block 285, the drive aggregator 103 configures a second component solid state drive (e.g., 109) in the plurality of component solid state drives 107 to 109 for a second optimization (e.g., 174) of memory operations. For example, the second optimization (e.g., 174) can be any of the possible optimizations discussed above in connection the first optimization (e.g., 172). In general, the first and second optimizations (e.g., 172 and 174) are different from each other.

At block 287, the drive aggregator 103 configures a first dataset in the first component solid state drive 107 according to the first optimization 172.

At block 289, the drive aggregator 103 configures a second dataset in the second component solid state drive 109 according to the second optimization 174 that is different from the first optimization 172.

For example, the first dataset is identified via a first namespace 181; and the second dataset is identified via a second namespace 183. The drive aggregator 103 is configured to store a first setting 171 in the first component solid state drive 107 to implement the first optimization 172 and store a second setting 173 in the second component solid state drive 109 to implement the second optimization 174.

In some implementations, the first component solid state drive 107 and the second component solid state drive 109 are hardwired for the first optimization 172 and the second optimization 174 respectively. For example, memory cells used in the first component solid state drive 107 can have a type that is different from the memory cells used in the second component solid state drive 109. For example, the controllers 141 in the different component solid state drive 107 and the second component solid state drive 109 can have different levels of processing power.

In other implementations, the first component solid state drive 107 and the second component solid state drive 109 are identical before the solid state drive 101 is connected to a host system (e.g., 111). The first and second optimizations can be configured via the settings 171 and 173 in response to commands to the host system (e.g., 111) and/or memory/storage usage patterns of the datasets in the namespaces 181 and 183.

The methods discussed above (e.g., in connection with FIGS. 4, 5, 9 and/or 15) can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods of FIGS. 4, 5, 9 and/or 15 are performed at least in part by the drive aggregator 103 of FIG. 1, 2, 3, 6, 7, 8, 10, or 11. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In some implementations, a communication channel between the host system 111 and a memory sub-system (e.g., the solid state drive 101) includes a computer network, such as a local area network, a wireless local area network, a wireless personal area network, a cellular communications network, a broadband high-speed always-connected wireless communication connection (e.g., a current or future generation of mobile network link); and the host system 111 and the memory sub-system can be configured to communicate with each other using data storage management and usage commands similar to those in NVMe protocol.

Some embodiments involving the operations of the drive aggregator 103 can be implemented using computer instructions executed by one or more microprocessors. The computer instructions can be configured as the firmware of the solid state drive 101. In some instances, hardware circuits can be used to implement at least some of the functions. The firmware can be initially stored in the non-volatile storage media, or another non-volatile device, and loaded into the volatile DRAM and/or the in-processor cache memory for execution by the microprocessors of the drive aggregator.

A non-transitory computer storage medium can be used to store instructions of the firmware of a memory sub-system (e.g., the solid state drive 101, or any of the component solid state drives 107 to 109). When the instructions are executed by the microprocessors, the instructions cause the memory sub-system to perform a method discussed above.

In general, an example machine of a computer system can have a set of instructions, for causing the machine to perform any one or more of the methods discussed herein. In some embodiments, such a computer system can correspond to a host system (e.g., the host system 111 of FIG. 1) that includes, is coupled to, or utilizes a memory sub-system (e.g., the solid state drive 101 of FIG. 1) or can be used to perform the operations of a drive aggregator 103 (e.g., to execute instructions to perform operations corresponding to the drive aggregator 103 described with reference to FIGS. 1-15). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example machine can include a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

A processing device discussed herein can include one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. A processing device discussed herein can also be one or more special-purpose processing devices such as an application specific integrated circuit (ASIC), a field programmable gate array (FPGA), a digital signal processor (DSP), network processor, or the like. A processing device generally is configured to execute instructions for performing the operations and steps discussed herein. The example machine can further include a network interface device to communicate over a computer network.

The data storage system disclosed herein can include a machine-readable storage medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable storage medium, data storage system, and/or main memory can correspond to the memory sub-system.

In one embodiment, the instructions stored in the example machine include instructions to implement functionality corresponding to a drive aggregator 103 (e.g., as described with reference to FIGS. 1-15). While the machine-readable storage medium may be discussed in an embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer.

Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A solid state drive, comprising:
    a drive aggregator; and
    a plurality of component solid state drives connected to the drive aggregator, each of the component solid state drives having a controller capable of processing commands from host systems;
    wherein a first component solid state drive in the plurality of component solid state drives is configured for a first optimization;
    wherein a second component solid state drive in the plurality of component solid state drives is configured for a second optimization; and
    wherein the drive aggregator is configured to:
        convert using an address map addresses received in the driver aggregator into addresses in the plurality of component solid state drives to forward commands received in the drive aggregator to the plurality of component solid state drives;
        monitor data access in the plurality of component solid state drives to identify a first dataset and a second dataset; and
        adjust the address map to host the first dataset in the first component solid state drive according to the first optimization and host the second dataset in the second component solid state drive according to the second optimization different from the first optimization.

2. The solid state drive of claim 1, wherein the first dataset is identified via a first namespace; and the second dataset is identified via a second namespace.

3. The solid state drive of claim 2, wherein the drive aggregator is configured to store a first setting in the first component solid state drive to implement the first optimization and store a second setting in the second component solid state drive to implement the second optimization.

4. The solid state drive of claim 2, wherein the first component solid state drive is hardwired for the first optimization; and the second component solid state drive is hardwired for the second optimization.

5. The solid state drive of claim 2, wherein the address map includes an optimization setting that implements a third optimization for a third namespace using multiple drives selected from the plurality of component solid state drives.

6. The solid state drive of claim 2, wherein the drive aggregator configures the address map to host the first namespace in the first component solid state drive in response to a request of the first optimization for the first namespace.

7. The solid state drive of claim 2, wherein the drive aggregator determines a usage pattern of the first namespace and configures the address map to host the first namespace in the first component solid state drive based on an association between the usage pattern and the first optimization.

8. The solid state drive of claim 2, wherein each of the component solid state drives is integrated within an integrated circuit package having a ball grid array (BGA) form factor.

9. A method, comprising:
    providing a solid state drive having a drive aggregator and a plurality of component solid state drives connected to the drive aggregator, each of the component solid state drives having a controller capable of processing commands from host systems;
    converting, by the drive aggregator using an address map addresses received in the driver aggregator into addresses in the plurality of component solid state drives in forwarding commands received in the drive aggregator to the plurality of component solid state drives;
    identifying a first dataset and a second dataset based on monitoring data access in the plurality of component solid state drives;

configuring a first component solid state drive in the plurality of component solid state drives for a first optimization of memory operations;
configuring a second component solid state drive in the plurality of component solid state drives for a second optimization of memory operations; and
adjusting, by the drive aggregator, the address map to:
host the first dataset in the first component solid state drive according to the first optimization; and
host the second dataset in the second component solid state drive according to the second optimization different from the first optimization.

10. The method of claim 9, wherein the first dataset and the second dataset are identified by a first namespace and a second namespace respectively.

11. The method of claim 10, further comprising:
receiving first and second commands from a host system to create the first and second namespaces respectively, wherein the first command identifies the first optimization for the first namespace and the second command identifies the second optimization for the second namespace; and
forwarding the first command to the first component solid state drive based on the first optimization identified in the first command; and
forwarding the second command to the second component solid state drive based on the second optimization identified in the second command.

12. The method of claim 11, further comprising:
storing an address map to associate the first namespace with the first component solid state drive and associate the second namespace with the second component solid state drive.

13. The method of claim 12, further comprising:
storing first settings into the first component solid state drive to implement the first optimization; and
storing second settings into the second component solid state drive to implement the second optimization.

14. The method of claim 13, further comprising:
configuring, in the address map, an optimization setting that implements a third optimization for a third namespace using multiple drives selected from the plurality of component solid state drives.

15. The method of claim 10, further comprising:
determining a usage pattern of the first namespace;
selecting the first optimization for the first namespace based on the usage pattern of the first namespace; and
moving the first namespace from a third component solid state drive in the plurality of component solid state drives to the first component solid state drive.

16. The method of claim 10, wherein each of the component solid state drives is integrated within an integrated circuit package having a ball grid array (BGA) form factor; and the component solid state drives are identical prior to the solid state drive being connected to a host system.

17. A driver aggregator, comprising:
at least one host interface configured to communicate with a host system;
a plurality of drive interfaces to communicate with a plurality of component solid state drives respectively, including a first component solid state drive configured for a first optimization of memory operations and a second component solid state drive configured for a second optimization of memory operations; and
a translation logic coupled between the at least one host interface and the plurality of drive interfaces;
wherein the translation logic is configured to operate an address map to convert addresses received in the at least one host interface into addresses in the plurality of component solid state drives in forwarding commands received in the at least one host interface to the plurality of drive interfaces; and
wherein the drive aggregator is further configured to monitor data access in the plurality of component solid state drives to identify a first namespace and a second namespace, and to adjust the address map to host the first namespace in the first component solid state drive according to the first optimization and host the second namespace in the second component solid state drive according to the second optimization different from the first optimization.

18. The driver aggregator of claim 17, further comprising:
an integrated circuit package, wherein the at least one host interface, the translation logic and the plurality of drive interfaces are packaged in the integrated circuit package;
wherein the translation logic includes a field programmable gate array (FPGA) or an application specific integrated circuit (ASIC).

19. The driver aggregator of claim 18, wherein the translation logic is configured, according to the address map, to forward first commands received from the host system and addressed to the first namespace to a first drive interface connected to the first component solid state drive and forward second commands received from the host system and addressed to the second namespace to a second drive interface connected to the second component solid state drive.

20. The driver aggregator of claim 18, wherein the translation logic is configured to move the first namespace from a third component solid state drive in the plurality of component solid state drives to the first component solid state drive in response to a determination to apply the first optimization to the first namespace.

* * * * *